(12) United States Patent
Sun

(10) Patent No.: US 11,710,264 B2
(45) Date of Patent: Jul. 25, 2023

(54) MULTI-GRAPH DISPLAY METHOD AND COMPUTER-READABLE STORAGE MEDIUM

(71) Applicant: JIANGSU GUANFU SCIENCE AND TECHNOLOGY INFORMATION CONSULTING CO., LTD., Yancheng (CN)

(72) Inventor: Jian Sun, Yancheng (CN)

(73) Assignee: Jian Sun, Shanghai (CN)

( * ) Notice: Subject to any disclaimer, the term of this patent is extended or adjusted under 35 U.S.C. 154(b) by 0 days.

(21) Appl. No.: 17/350,742

(22) Filed: Jun. 17, 2021

(65) Prior Publication Data

US 2021/0312676 A1 Oct. 7, 2021

Related U.S. Application Data

(63) Continuation of application No. PCT/CN2018/121880, filed on Dec. 19, 2018.

(51) Int. Cl.
*G06T 11/20* (2006.01)
*G06F 16/26* (2019.01)
*G06T 11/00* (2006.01)
*G06Q 40/06* (2012.01)

(52) U.S. Cl.
CPC ............ *G06T 11/206* (2013.01); *G06F 16/26* (2019.01); *G06T 11/001* (2013.01); *G06T 11/203* (2013.01); *G06Q 40/06* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2005/0273408 A1* | 12/2005 | Bandman | G06Q 40/00 705/35 |
| 2009/0006226 A1* | 1/2009 | Crowder | G06Q 40/12 705/30 |
| 2009/0006241 A1* | 1/2009 | Zhao | G06Q 40/04 705/37 |
| 2009/0259599 A1* | 10/2009 | Wallman | G06Q 40/02 705/36 R |
| 2011/0178950 A1* | 7/2011 | Parga Landa | G06Q 40/06 705/36 R |

(Continued)

*Primary Examiner* — Jeffrey J Chow
(74) *Attorney, Agent, or Firm* — Zhigang Ma

(57) ABSTRACT

Multi-graphic display method and computer-readable storage medium are disclosed. In the multi-graphic display method, a processor is used to execute instructions to perform the step of, within a display window, determining the position of each financial graphic, determining a plurality of rectangular sub-regions in the display window so that the financial varieties of the financial graphics contained in the single rectangular sub-region are the same, and setting the financial characteristics of each financial graphic, and setting a financial variety of financial graphics within each of the rectangular sub-regions. In the case where two or more rectangular sub-regions within the display window contain a plurality of periodic financial graphics, the financial characteristics of at least two of the periodic financial graphics between at least two of the rectangular sub-regions are identical.

20 Claims, 23 Drawing Sheets

(56) References Cited

U.S. PATENT DOCUMENTS

| | | | |
|---|---|---|---|
| 2012/0303548 A1* | 11/2012 | Johnson | G06F 3/04817 |
| | | | 705/36 R |
| 2015/0161732 A1* | 6/2015 | Lachance | G06Q 40/06 |
| | | | 705/36 R |
| 2016/0225086 A1* | 8/2016 | Seitz | G06Q 40/06 |

* cited by examiner

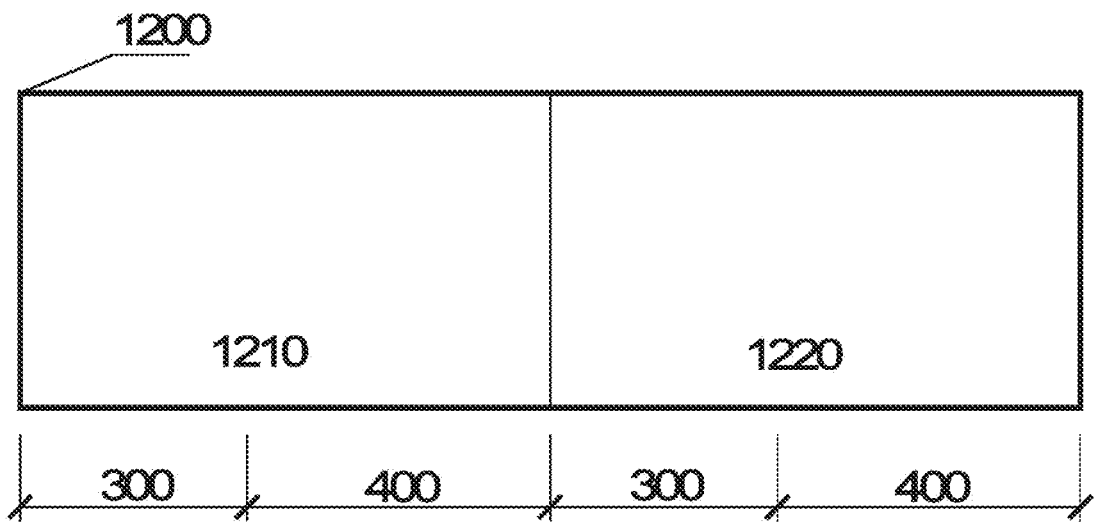
FIG. 12
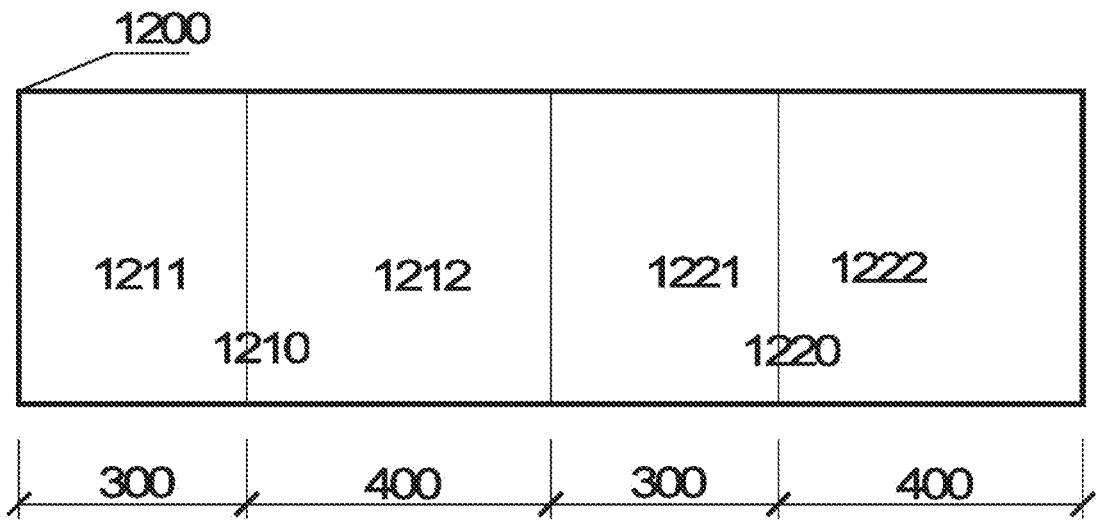
FIG. 13
FIG. 14

| 1600 | |
|---|---|
| 1601 | Dividing manner |
| 1602 | Sizing manner |
| 1603 | Sizing manner according to financial characteristics |
| 1604 | Grid manner |
| 1605 | Coordinate manner |
| 1606 | Set financial characteristics |
| 1607 | Set as a rectangular sub-region |
| 1608 | Add a rectangular sub-region |
| 1609 | End |

FIG. 16

Segmentation manner ✕

○ X direction
● Y direction   Average number: [ 5 ]

1710

Dimension manner ✕

● X direction
○ Y direction   Dimensions: [ 100, 100, 150, 100 ]

1720

Sizing manner based on financial characteristics ✕

● X direction     Financial characteristics
○ Y direction     [ 60M ,30M ,Day,1M ]

1730

Grid manner ✕

Average number in X direction: [ 2 ]
Average number in Y direction: [ 5 ]

1740

Coordinate manner ✕

Upper left corner    X: [  ]   Y: [  ]
Lower right corner   X: [  ]   Y: [  ]

MULTI-GRAPH DISPLAY METHOD AND COMPUTER-READABLE STORAGE MEDIUM

TECHNICAL FIELD

The present disclosure relates generally to a multi-graph display method, and more specifically, to a multi-graph display method for financial varieties. The present disclosure also relates to a computer readable storage medium.

BACKGROUND

Financial products refer to assets whose transaction price is time-related, such as stocks, futures, foreign exchange, funds, bonds, options, virtual currencies and other financial products, as well as ocean shipping prices, spot goods and relevant indicators.

The graphic of each financial variety reflects a financial characteristic of the financial variety. Financial characteristics are divided into periodic financial characteristics (hereinafter referred to as periodic characteristics) and non-periodic financial characteristics (hereinafter referred to as non-periodic characteristics).

The graphic that reflects the periodic characteristic is called periodic financial graphic (hereinafter referred to as the periodic graphic), and its graphic elements are drawn in time increment. The horizontal axis on the graphic represents time increasing from left to right, with the time on the far right being the time closest to the present time. Periodic graphics include tick chart, time-sharing graphic, 30-minute graphic, daily graphic, weekly graphic, etc. The financial characteristics of the graphics are divided into transaction, hour, 30 minutes, day, week, etc., the difference between those characteristics lies in the different time ranges represented by single graphic elements. The graphic elements can be K-lines, bar lines, polylines, etc., which are independent from financial characteristics. A graphic that reflects financial characteristics other than periodic characteristics is called a non-periodic financial graphic (hereinafter referred to as non-periodic graphic). Frequently used non-periodic graphics include detailed graphics of transactions, transaction-by-transaction graphics, financial information graphics, information graphics, point and figure graphics, etc. Periodic graphic and non-periodic graphic are collectively called financial graphic.

There are two demands for observing financial varieties. One is that for a single financial variety, we need to observe the trend of the recent period and the position of the current price within a longer period of time. Therefore, it is necessary to combine the long-period graphic reflecting macroscopic state with the short-period graphic reflecting microscopic state for comprehensive analysis. This requires displaying the same financial variety's financial graphics of different periods as many as possible. On the other hand, a financial variety needs to be compared with other financial varieties including indicators, and the relative strength of this financial variety in different time ranges can only be found by respectively comparing its long-period graphic and short-period graphic under the same market background conditions. This requires the display of as many financial varieties as possible.

To achieve the above purpose, it is preferable to use a multi-graphic display. The current multi-graphic display shows that either there is only one financial variety in the entire display window, or although there are a plurality of financial varieties, each financial variety has only one periodic graphic for comparison. Therefore, in order to achieve the above purpose, it is necessary to switch all the graphics in the display window on the screen several times. However, the switch of graphics not only wastes time and reduces efficiency, but most importantly, many details on the graphics may be forgotten after the switch, thus neglecting useful details, or drawing wrong conclusions, unable to achieve a comprehensive and adequate comparison of different financial varieties on the same screen.

SUMMARY

An aspect of the disclosure relates to a multi-graphic display method, wherein, instructions are executed using a processor to perform the following steps:

Determining the position of each financial graphic within a display window, determining a plurality of rectangular sub-regions within the display window so that the financial varieties of the financial graphics contained in a single rectangular sub-region are the same, setting the financial characteristics of each financial graphic, setting the financial varieties of financial graphics in each rectangular sub-regions, wherein, in the case that two or more rectangular sub-regions in the display window respectively contain a plurality of periodic financial graphics, the financial characteristics of at least two of the periodic financial graphics between at least two of the rectangular sub-regions are the same, or in the case that only one rectangular sub-region within the display window contains a plurality of periodic financial graphics, all or a portion of the other rectangular sub-regions within the display window are dynamically associated with the one described rectangular sub-region.

Another aspect of the present disclosure also relates to a computer readable storage medium on which a computer program can be stored which, when being loaded and executed by a processor, can be used to implement the aforementioned multi-graphic display method.

BRIEF DESCRIPTION OF THE DRAWINGS

Other features of the present disclosure are further described below in conjunction with specific embodiments and with reference to the attached drawings. In the drawings, the same or corresponding technical features or components will be denoted by the same or corresponding reference numerals.

FIGS. 12-13 are schematic diagrams of a multi-step partitioning operation according to an embodiment of the present disclosure;

FIG. 14 is a schematic diagram of a parameter input interface of a multi-step partitioning process according to an embodiment of the present disclosure;

FIG. 16 is a schematic diagram of a menu displayed during a human-machine interaction according to an embodiment of the present disclosure;

FIG. 17 is a schematic diagram of a setting window displayed during a human-machine interaction according to an embodiment of the present disclosure;

DETAILED DESCRIPTION OF EMBODIMENTS

Figure 1:
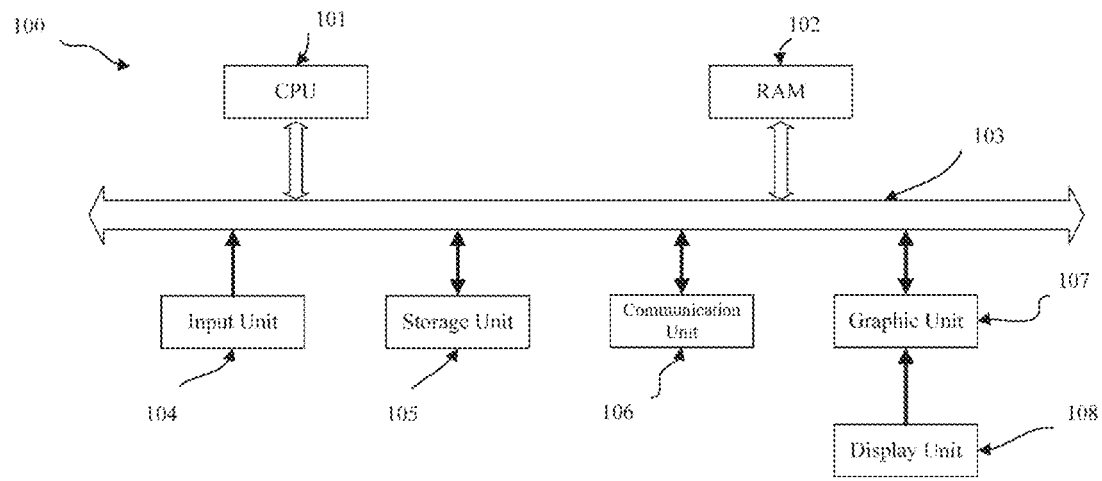
FIG. 1 is a block diagram showing a hardware configuration of a computer system capable of implementing an embodiment of the present disclosure.

FIG. 1 is an example of a hardware configuration of a computer system 100 used to implement embodiments of the present disclosure. It should be noted that the hardware configuration is merely an example, and a computer system including hardware that is different from the illustrated hardware may be employed, for example, unnecessary components may be removed or additional components may be added thereto. Examples of computer systems include personal desktop computers, workstations, servers, and mobile devices such as mobile phones, laptops, tablets, personal digital assistants (PDAs), etc. In addition, the computer system 100 is applicable not only to operating systems for keyboards and mice, such as Windows, MacOS, and Linux, but also to operating systems for touch screens, such as Android and iOS.

The computer system 100 consists of a processing unit 101 connected via a communication bus 103, a random access memory RAM 102, and an input unit 104, a storage unit 105, a communication unit 106, and a graphics unit 107 connected via a communication bus. The program may be recorded in the storage unit 105 in advance. The storage unit 105 includes, for example, a floppy disk, a magnetic hard disk, a solid state disk, a CD_ROM disk, a DVD disk, an MO magneto-optical disk, a USB flash disk, etc. In another embodiment, a read-only memory ROM connected to the bus is also included.

The processing unit 101 includes a central processing unit (CPU) and has total control over the processing executed at the computer system 100. For example, the processing unit 101 performs the operations shown in FIG. 2 described below.

The input unit 104 is configured with a keyboard, a mouse, a touch panel, etc. In addition, if a relevant command is input into the computer system 100 by user manipulation of input unit 104 or the like, the CPU 101 loads the program of the embodiment herein in the storage unit 105 onto RAM 102 for executing the program.

In addition, the program may be downloaded into the computer system and executed through a wired or wireless network to which the communication unit 106 such as a network adapter is connected.

The display unit 108 displays a screen output drawn by software running on the computer system. Examples of the display unit include devices such as an LCD, an LED display, a CRT display, a projection device, or a touch screen. The number of display units is not limited to one as shown in FIG. 1, but may be plural for achieving an extended display.

The graphic unit 107 controls the display of each graphic on the display unit 108. Specifically, the graphics unit 107 corresponds to, for example, a graphics controller (graphics processing unit GPU).

Figure 2:
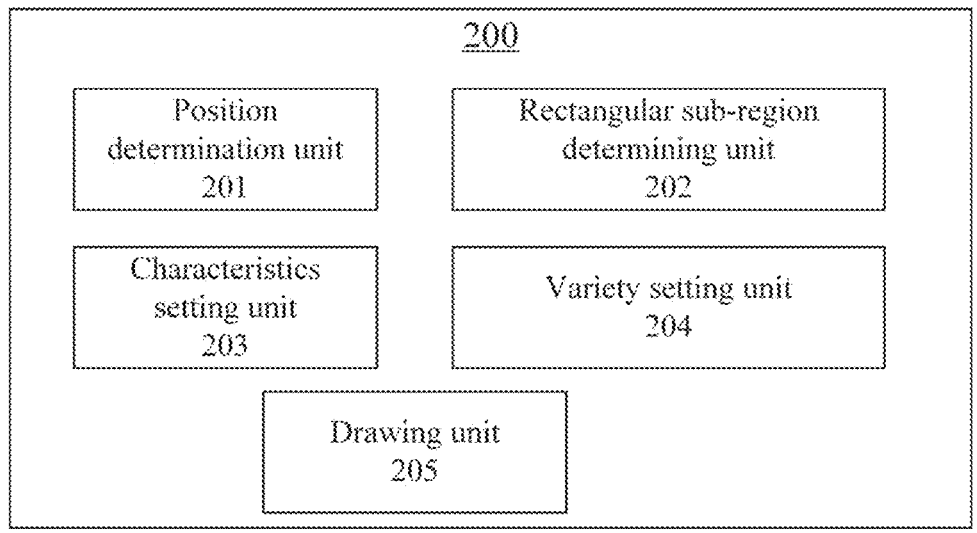
FIG. 2 is a block diagram showing the configuration of a multi-drawing program according to an embodiment of the present disclosure.

FIG. 2 is a block diagram illustrating the configuration of a multi-drawing program 200 implemented on the computer system 100 according to an embodiment of the present disclosure. If the multi-drawing program 200 is installed into the storage unit 105 in the computer system 100, the processing unit 101 can read the program in the storage unit 105 and execute instructions therein, thus implementing one or more embodiments described herein. For example, the operations shown in FIG. 2 are performed. In the following description, for convenience, various types of processing performed by the processing unit 101 are also described as being performed by the multi-drawing program 200 of the embodiments herein. For example, a description of "the processing unit 101 of the computer system 100 in which the multi-drawing program 200 is installed executes instructions for implementing operation" may be simplified to a description of "the multi-drawing program 200 executes instructions".

In addition, the program of the present embodiment may be executed by one computer (processing unit) or may be processed in a distributed manner by a plurality of computers. In addition, that program may be transferred to a remote computer for execution.

The position determining unit 201 determines the position of each financial graphic within the display window. The rectangular sub-region determining unit 202 is configured to determine a plurality of rectangular sub-regions within the display window so that the financial varieties of the financial graphics contained within the single rectangular sub-region are the same. The details of the rectangular sub-regions will be described later. The feature setting unit 203 is configured to set a financial characteristic of each financial graphic. The category setting unit 204 sets a financial variety of a financial graphic within each rectangular sub-region. The drawing unit 205 is configured for drawing determined financial graphics such as financial characteristics and financial varieties. The units in this section are virtual units that perform certain operations in the program, and their codes may intersect with each other. Specific embodiments of the respective operations will be described in detail later.

First, terms required for describing the embodiments are introduced.

Display window: A display window refers to the maximum area within the client area of the program frame window on the display screen of the display unit for drawing a plurality of graphics. In the embodiments herein, the client area of the program frame window that may fill the entire screen is covered by a view window, which is the display window. The point on the upper left corner of the display window is taken as the origin of coordinate, the origin to the right is taken as the X direction, the origin to the downward is taken as the Y direction, and the pixel is taken as the coordinate value. Other coordinate systems may also be used.

Child window: A child window refers to the window contained within the display window in the present disclosure, whose parent window or higher-level parent window is the display window itself.

Rectangular region: A rectangular region on the display screen that is determined in each step of progressively determining the position of the financial graphic within the display window, including the following final rectangular regions and rectangular sub-regions.

Final display region: The rectangular region where the financial graphic is located, which does not need to be further partitioned.

Rectangular sub-region: A rectangular sub-region refers to a rectangular region within the display window and has the following characteristics.

First, all the financial graphics included have the same financial variety code, such as a stock code. When the variety code of a financial graphic is set in the initial setting or in the man-machine interaction, the variety code of each financial graphic in the rectangular sub-region automatically remains consistent. Therefore, a rectangular sub-region corresponds to a financial variety. For example, after clicking any graphic in the rectangle sub-region with the mouse, and then entering a new stock code with the keyboard, all financial graphics in the rectangle sub-region will become the graphic corresponding to the new code.

Second, the number, arrangement and size of the financial graphics of the rectangles inside the rectangular sub-regions are arbitrary. The upper limit of the number is limited only by the size of the display window. Graphics can be arranged horizontally, vertically, or a combination of the two. In addition, the size of each graphic may be set as desired or in accordance with the size requirements of financial characteristic.

Third, the financial characteristics of a plurality of internal financial graphics may be any combination, either a combination of a periodic graphic with a non-periodic graphic, or combination of periodic graphics, or combination of non-periodic graphics. Also, the financial characteristic of each graphic may be set independently, and the order in which they are combined can be arbitrary.

The following is using stocks as an example of a financial variety to illustrate the multi-graphic display method of the present disclosure, but it should be understood that the following description is also applicable to multi-graphic display methods of other financial varieties, and merely as an example and not as a limitation to the present disclosure.

Figure 3:
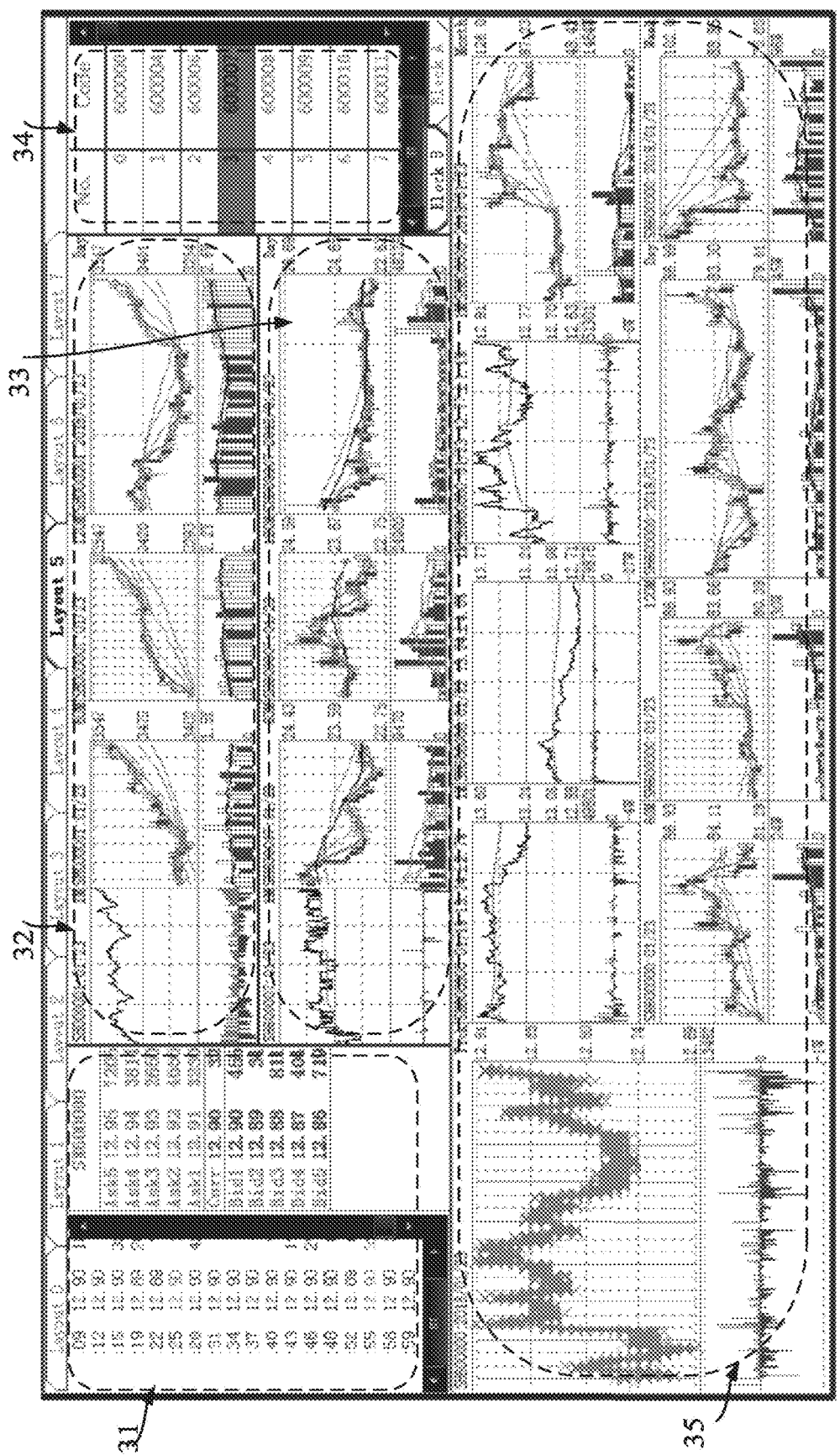
FIG. 3-4 are configurations of a screenshot displayed on a display device of a multi-drawing program according to an embodiment of the present disclosure.

FIG. 3 is an example of a screenshot displayed on a display unit by executing the multi-drawing program 200 of FIG. 2. This snapshot and the snapshots described later are only examples in this disclosure, and the multi-graphic display of this disclosure is not limited to such examples. Meanwhile, the drawing of financial graphic in the snapshot, including the words and figures therein, is an existing technology, which will not be described in this paper.

As shown in FIG. 3, the display window includes five rectangular sub-regions 31-35 marked by dashed boxes with rounded corners. In the rectangular sub-region 31, a tick chart and a detailed graphic of transactions of one stock are displayed from left to right. In the rectangular sub-region 34, a stock list of a plate in which a stock is located is displayed, the plate being a set of financial varieties of the same characteristic. In the rectangular sub-area 35, nine periodic graphics of a stock are displayed, with their periodic characteristics labeled in the upper right corner of each graphic. In the snapshots of the embodiments herein, the financial characteristics represented by Tick, 1M, 30M, 60M, 120M, Day, Week, and Month in the upper right corner of each periodic graphic are transaction, minute, 30 minutes, 60 minutes, 120 minutes, day, week, and month, respectively. In the example herein, the rectangular sub-regions 31, 34, 35 form a combined rectangular sub-region which collectively displays the various financial graphics of the first stock, so that the status of the stock under various periodic characteristic is very clear, and is the main financial variety in the display window.

In the same display window, there are also rectangular sub-regions 32 and 33, which respectively display the indicator and another financial variety of the same plate, and each of them has four periodic graphics, and their financial characteristics are respectively 1M, 60M, 120M and Day. It is also noted that in the rectangular sub-region 35, there are also four graphics of the first stock with the same financial characteristics described above. Therefore, in the same display window, three stocks are displayed, and each stock displays four financial graphics with the same periodic financial characteristics described above. Therefore, in the case that two or more rectangular sub-regions in the display window contain a plurality of periodic financial graphics, the financial characteristic of at least two periodic graphics between at least two of the rectangular sub-regions are made the same, namely, in the two or more rectangular sub-regions, there is at least one rectangular sub-region inside which there are at least two financial characteristics of the periodic financial graphic, each has the same financial characteristics as the same number of financial graphics respectively within another rectangular sub-region. In this way, without switching, multi-periodic graphics of multi-financial varieties can be compared on the same screen, with a comprehensive and efficient contrast effect.

Although the above snapshots show as many financial graphics as possible of the major financial varieties, it has the disadvantage that there are only three stocks in the entire display window.

Figure 4:
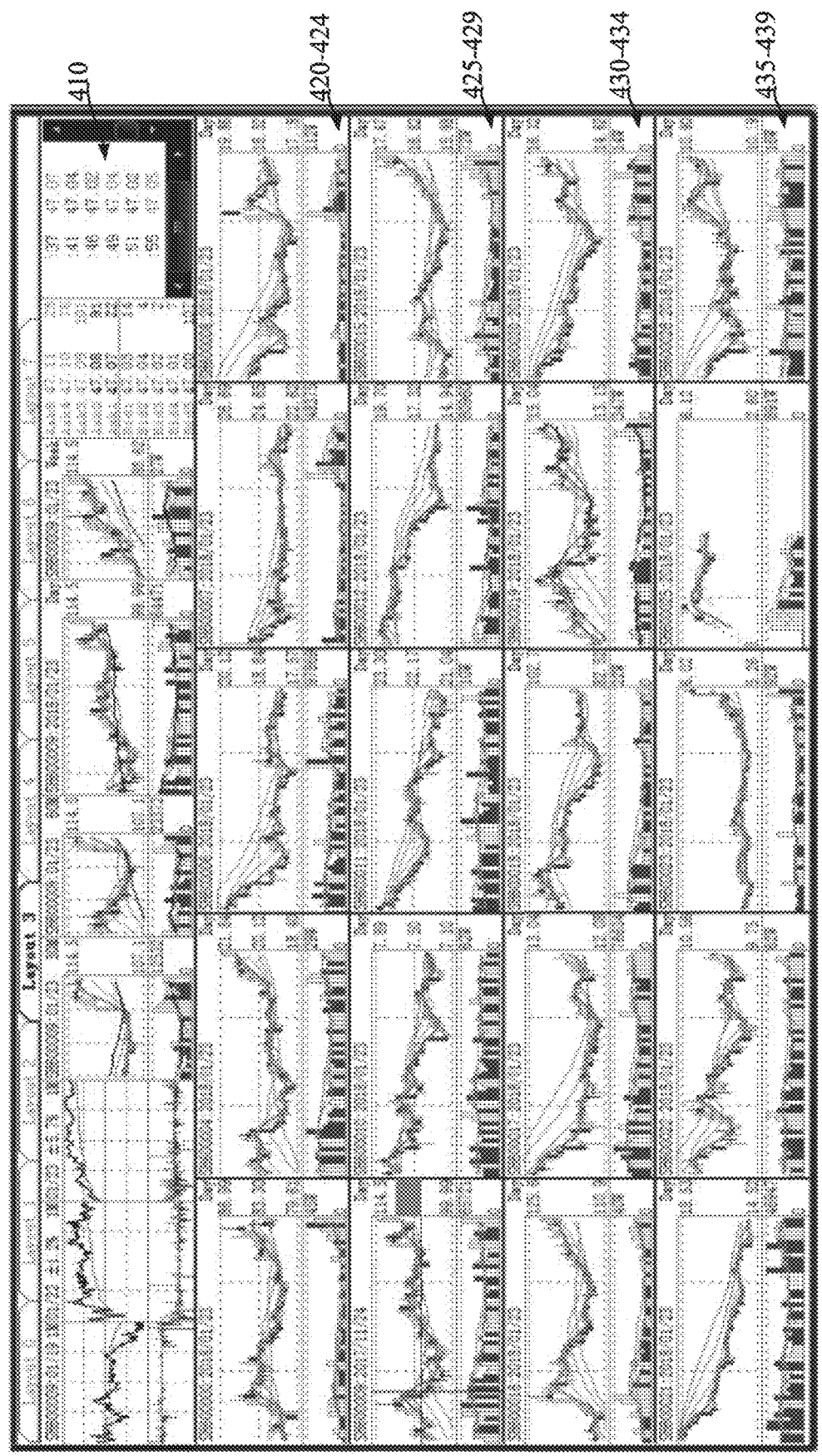

In order to display as many financial varieties as possible, the present disclosure implements the embodiment shown in the snapshot of FIG. 4. The uppermost row in FIG. 4 is rectangular sub-region 410, showing a plurality of financial graphics of a stock. Each graphic below is a rectangular sub-region with the same periodic financial characteristics and different financial varieties. Each row is numbered from left to right first, and then from top to bottom respectively, 420 to 439. In the embodiment, the rectangular sub-regions 420-439 are arranged to be dynamically associated with the rectangular sub-region 410. The dynamic association will be described in detail later, and the meaning here is that any one of the rectangular sub-regions 420-439 is clicked with the mouse, the financial varieties of all the financial graphics in the rectangular sub-area 410 will be immediately switched to the same stock as the clicked financial graphic. Since this switch is only a redrawing of a partial region within the display window, it is much faster than redrawing all the financial graphics within the display window.

This embodiment realizes that in the case that only one rectangular sub-region within the display window contains a plurality of periodic financial graphics, all or a portion of the other rectangular sub-regions within the display window are dynamically associated with the one rectangular sub-regions. Although there is a switch, the single financial graphic of multiple stocks in the rectangular sub-regions 420-439 remains unchanged during the switch process, so the same-screen comparison of the periodic financial characteristic graphic is still maintained. Meanwhile, through a simple operation such as clicking, the stocks in the rectangular sub-region 410, which is a partial region within the display window, can be quickly switched, so as to realize the rapid comparison of other financial graphics of adjacent or non-adjacent stocks at the same position on the screen. Therefore, it still has the comprehensive and efficient contrast effect of a plurality of financial varieties. Although there is a partial graphic switch within the display window, the display window contains more financial varieties. Therefore, compared with the snapshot of FIG. 3, which is suitable for key observation of the state of one financial variety under multiple financial characteristics, the present snapshot is more suitable for monitoring a plurality of financial varieties, that is, when a stock in the rectangular sub-region 420-439 is found to have a change, click on the graphic, and other financial graphics of this stock can be observed in the rectangular sub-region 410, and a decision can be made quickly.

As can be seen from the above snapshots of the embodiment of FIGS. 3 and 4, at least one rectangular sub-region contains a plurality of financial graphics of one financial variety, and the status of the financial variety is displayed from multiple angles. Meanwhile, there are multiple rectangular sub-regions in the same display window to display a plurality of financial varieties. In this way, a comprehensive and efficient comparison of a plurality of financial varieties under multiple financial characteristics can be achieved without switching or only through simple and rapid switching. Although the periodic graphic can be compared with the non-periodic graphic, the periodic graph can reflect the price trend of the financial varieties. Meanwhile, the rectangular sub-region itself is rectangular, which has the advantage of being simple and neat, making it easy for users to identify the region where the financial variety is located, that is, it is easy to identify the financial graphics belonging to the same financial variety. This is particularly important when screens are getting larger and there may be more than 20 or 30 financial graphics on a single screen.

A software implementation of a rectangular sub-region according to one embodiment is described in detail below.

In this paper, all the code about the implementation of the system are written using the mechanism of object-oriented programming, such as VC++, and make full use of C++ standard library. However, part of the syntax is simplified in order to highlight the key points, including omitting or reducing formal parameters of the function, and representing part of the code with a literal description, but a person skilled in the field should be able to implement them accordingly.

Using the object-oriented method, the corresponding classes of financial graphics are defined as follows:

Class FinancialChart
{
// Basic variable
int m_iFinancialreature; // Financial Characteristics
std:: string m_strCode; // Financial variety code
RECT m_rect; // the rectangular
// Variables related to rectangular sub-regions
RectangularSubregion*m_pRectSubregion; // points to the rectangular sub-region in which it is located, defined after
. . .
public:
// the function corresponding to the above basic variable
void SetCode (char*pFinancialCode) // Set financial code
{m_RectangularSubregion→SetCodeAll (pFinancialCode); }
void Draw (CDC*pDC); // Drawing function for drawing concrete financial graphics
. . .
}

The program also defines the objects of the financial graphic class, that is, a general container of the financial graphic objects, which is used to store all the pointers of the financial graphic objects in the display window. A container is a data structure that contains multiple objects of the same type, which is similar to an array. The standard library container std:: vector is used here.

There are two methods to realize the rectangular region in the display window. The first is the container method, that is, the object-oriented method is adopted to define the rectangular region class, which is the container containing the pointer of the financial graphic object:

Class RectangularSubregion
{
// Basic variable
Std:: Vector<FinancialChart*>m_contOfFinancialChart; // container for internal financial graphic
RECT m_rectOfSubregion; // in rectangular region
. . .
// Extended variables, as described later
Rectangularsubregion*m_pSubregionOfStaticRelating; // Static associated rectangular sub-regions
Rectangularsubregion*m_pSubregionOfDynamic Relating; // Dynamic associated rectangular sub-regions
std:: string m_strOfAssembly; // set of associated financial varieties
. . .
// Function corresponding to basic data
Void SetCodeAll (char*pFinancialCode); // Set each financial graphic in the same financial code
Void Draw (CDC*pDC); // Drawing internal financial graphics
}

As can be seen from the above, when a code of a financial graphic is set, For example, when the new code is "SH600000," when the function of FinancialChart:: SetCode ("SH600000") of the financial graphic object is called, the RectangularSubregion:: SetCodeAll function of the rectangular sub-region is called. This function accesses the financial graphics in the member variable m_contOfFinancialChart one by one so that the m_strCode of all financial graphics inside the rectangular sub-region is the same code, thereby ensuring that the codes of the financial graphic inside the rectangular sub-region are all the same. The program also defines a general container for rectangular sub-region objects, which is used to store pointers to all rectangular sub-region objects in the display window. In one embodiment, that RectangularSubregion:: Draw function of each rectangular subregion object is called in the drawing function of the display window, which in turn calls the FinancialChart::: Draw function of each financial graphic within it, Finally, all the financial graphics in the display window are drawn.

The realization of rectangular region can also be achieved by static association method, that is, financial graphic objects can be connected by static association method without defining special rectangular region class. In the present disclosure, the meaning of the static association is that a class object pointer is set in the definition of a class, through which multiple objects of the class are connected in series in a closed-loop manner, and when information of one object is set, such as the code of the financial variety, other concatenated objects need to be automatically set by the associated pointer.

For example, in another embodiment, the financial graphic class FinancialChart is modified so that the m_pRectSubregion parameter is removed, the m_pNextChart variable of type FinancialChart* is added as a static associative pointer, and the SetCode function is modified.

In use, for example, there are three financial graphic object A, B, C, and that association of the three objects is first set at one time:

A. m_pNextChart=& B; // A is associated with B
B. m_pNextChart=& C; // B is associated with C
C. m_pNextChart=& A; // C is also associated with A That is, the static association pointer is used to connect A, B, C in series, and finally C points to A to form a closed-loop series.

Then, if the financial type of any object such as the object B is to be set as the name pointed by the character pointer pFinancialCode, the B. SetCode function is called, in which the following operations are performed through a loop structure:

B. m_strCode=*pFinancialCode; // Set financial variety of B
Financialchart*pNextChart=B.m_pNextChart; // now pNextChart points to C;
Pnextchart→m_strCode=*pFinancialCode; // Set financial variety of C
Pnextchart=pNextChart→m_pNextChart; // now pNextChart points to A;
Pnextchart→m_strCode=*pFinancialCode; // Set financial variety of A
Pnextchart=pNextChart→m_pNextChart; // now pNextChart points to B;
// the B object is not set because it has already been set, and the function returns.

After this function is called, the financial varieties of objects B, C and A will be set successively, and the function returns when pNextChart points to the first object B, thus ensuring that the financial varieties displayed by the statically associated objects are always the same. That is to say, a rectangular sub-region composed of three financial graphics always displays one financial variety. The objects that form the static association are not limited to three, but can be two, four and more.

After a financial graphic object is statically associated, that following method can be used if it is necessary to obtain the location of the rectangular sub-region: Visiting each financial graphic object statically associated one by one, two points, namely the upper left point and the lower right point of the rectangular sub-region, whose X and Y coordinates are both minimum and maximum at the same time, are obtained respectively, so as to determine its position.

In the embodiment of the static association method, after the setting of financial information such as financial varieties is completed, each financial graphic object in the object total container of the financial graphic can be called one by one to complete the drawing of a plurality of graphics in the display window.

In embodiments of the container method, there is greater scalability and flexibility due to the separate classes of the rectangular subregions, as described later. Embodiments later in this article, unless otherwise specified, are performed according to the container method. For the static association method, the static association pointer can traverse all the financial graphics to obtain a group of financial graphics which all belong to a single rectangular region, and then convert them into container-like method. Therefore, a person skilled in the field can implement a corresponding embodiment of the static association method with reference to the principle of the container method embodiment.

A multi-graphic display method according to an embodiment of the present disclosure is described below with reference to the flowchart of FIG. 5.

Figure 5:
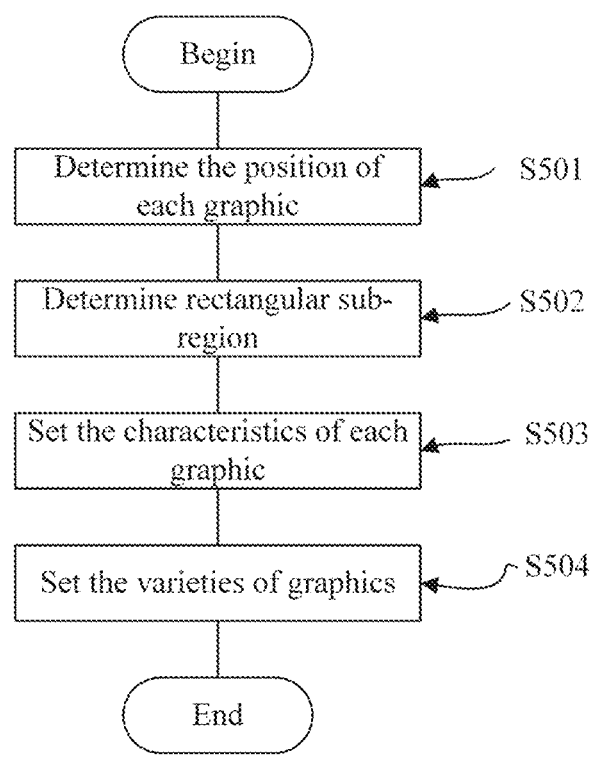
FIG. 5 is a flowchart of a multi-graphic display method according to an embodiment of the present disclosure.

In the present embodiment, the processing shown in the flowchart in FIG. 5 begins at a time point as a start point, at which time the multi-drawing program 200 is initially operated to draw each graphic, or to redraw the graphic. It should be noted that the sequence of steps is not defined in FIG. 5, only the steps that exist.

In step S501, the processing unit 101 of the computer system 100 executes an instruction, or simply, the multi-drawing program 200 executes to determine the position of each financial graphic within the display window.

The program of this embodiment adopts a method of partitioning the display window in multiple steps to determine the position of each financial graphic step by step. In the first partitioning step of the multi-step partitioning, the entire display window is set as a target rectangular region, that is, a rectangular region to be partitioned within. In each subsequent partitioning step, a rectangular region partitioned in that display window in the preceding partitioning step is set as a target rectangular region, and then partitioning is carry out, until the rectangular region where all the financial graphics located are partitioned. Since the rectangular region where the financial graphic is located is no longer partitioned, it can be also called the final display region.

Figure 7:
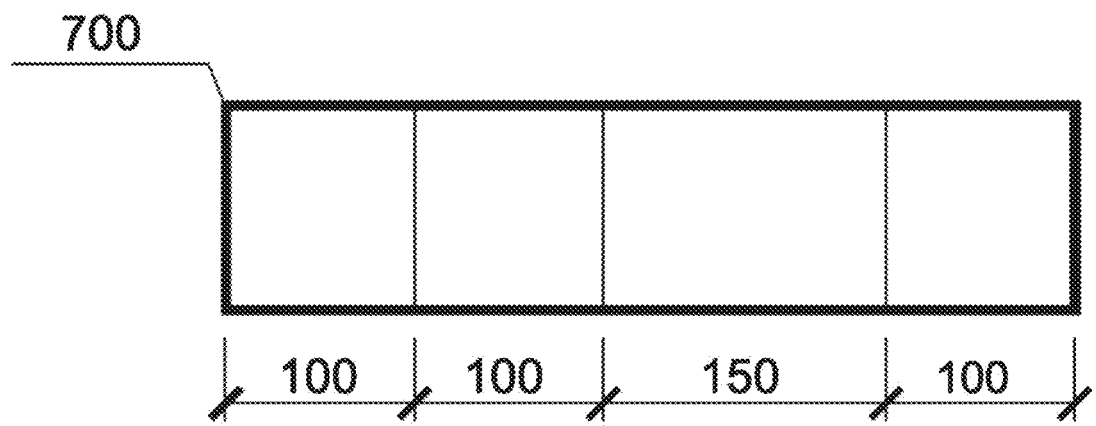
FIG. 7 is a schematic diagram of the sizing manner used in a single partitioning step according to an embodiment of the present disclosure.

In a single partitioning step, any of the following various partitioning manners can be used:

(1) Dividing manner, in which the target rectangular region is equally partitioned into multiple parts along the X direction or the Y direction. For example, in FIG. 6, the target rectangular region 600 is partitioned into 5 equal parts from top to bottom, where 5 is a partitioning parameter;

(2) Sizing manner, in which the target rectangular region is partitioned along the X direction or the Y direction according to a fixed size. For example, as shown in FIG. 7, the target rectangular region 700 is partitioned in the X direction by the pixel size with the partitioning parameters of 100, 100, 150, and 100. But if the sum of the sizes in this manner is not equal to the actual total length of the target rectangular region in the partitioning direction, each pixel size is partitioned into the actual total length as a proportional value. For example, in FIG. 7, if the actual total length in the horizontal direction is 900, which is larger than the sum 450 of the sizes in the partitioning manner, the actual total length 900 is partitioned in a ratio of 100:100:150:100.

Further, when the positions of the financial graphics are positioned using the sizing manner, if two or more financial graphics are arranged as a row or a column in a target rectangular region to be partitioned, their size is set in advance according to the financial characteristics thereof. In the case of the rectangular sub-regions 32 and 33 in FIG. 3 and the rectangular sub-region 410 in FIG. 4, when the sizing manner is adopted, the width of the daily K-line chart is set as 150 in advance, and the widths of the other K-line charts and time-sharing graphics are all set as 100. The width of the non-periodic graphic such as the a detailed graphic of transactions and tick chart are 100 and 120 respectively. Therefore, by directly inputting the financial characteristics, the width of each financial graphic can be determined according to a preset setting, and then partitioned according to the sizing manner, so it is called a sizing manner according to the financial characteristics.

(3) Grid manner, in which the target rectangular region is partitioned into multiple parts along the X direction and the Y direction by the dividing manner. For example, in FIG. 8, the target rectangular region 800 is partitioned into 5×2 rectangular sub-regions, whose partitioning parameters are equal fraction 5 in the Y direction and equal fraction 2 in the X direction. Further, each direction may also be partitioned by a sizing manner.

(4) Coordinate manner, in which the target rectangular region is partitioned by the coordinates of the points. For example, by directly inputting the coordinates of the upper left corner point and the lower right corner point of a rectangular region 801 within the target rectangular region 800 in FIG. 8, the rectangular region 801 is determined. Since the display window is always partitioned by various large and small rectangular regions, this method is suitable for various situations. However, since the partitioning parameters input at one time are a pair of coordinates and only one new rectangular region can be formed, the input amount for a plurality of rectangular regions is large and the efficiency is low. In addition, this method requires the new rectangular areas to be seamlessly joined, so the requirement for data preparation is high.

It should be noted that in each of the above partitioning manner, sizing manner and grid manner, the internal parameter setting thereof is different, and the number of newly added rectangular regions may also be different. For example, for a dividing manner in which one is partitioned into five, or a sizing manner in which there are five size values, an original target rectangular region becomes five rectangular regions. This is equivalent to adding four rectangular regions, while the dividing manner that is partitioned into two, or the sizing manner that has only two size values, only one rectangular region is added, so this is considered a different single-step partitioning manner. In general, the grid pattern corresponds to the single-step partitioning manners of a plurality of newly added rectangular regions. That is, the same single-step partitioning manner is used in the sense of the present disclosure only if the same partitioning manner is used and the parameters related to the number of newly added rectangular regions within the partitioning manner are the same. This procedure can be implemented in a single partitioning step to use one of a plurality of partitioning manners, and further use one of a plurality of partitioning manners to finally determine the position of financial graphics and rectangular sub-regions.

In step S502, the processing unit 101 executes instructions to perform step of determining a plurality of rectangular sub-regions within the display window so that the financial varieties of the financial graphics contained within a single rectangular sub-region are the same.

As previously described, a rectangular sub-region is a collection of financial graphics with the same financial variety. In an example using the container method, during the execution of step S501 described above, a new rectangular region that is partitioned in a certain partitioning step may be directly determined as a rectangular sub-region. The financial graphics that are partitioned in the following step within the rectangular sub-region are all set to have the same financial variety. In either the contain method or the static association method, it is also possible to determine not all of the rectangular sub-regions in the partitioning process but, after the partitioning is complete, for the financial graphics of the belonging rectangular sub-region which is still not determined, One or more graphics having the same financial variety and are located in the same rectangular region are added to a new rectangular sub-region.

In step S503, the processing unit 101 executes an instruction to execute setting of the financial characteristic of each financial graphic. After determining the financial characteristics of the graphic, the desired data and the performance characteristics of the data can be determined, for example, in the case of periodic characteristics, the time ranges represented by individual graphic elements on the periodic graphic and vice versa. Default graphic elements, default indicators, and the like can also be determined according to financial characteristics. These belong to the state of the art.

In step S504, the processing unit 101 executes an instruction to execute setting of the financial varieties of the financial graphics within each rectangular sub-region. For example, by calling the FinancialChart:: Setcode function in the previous embodiment, when the financial variety of any financial graphic is set, the same setting is automatically made for other financial graphics in the rectangular sub-region where the financial graphic is located.

Although not shown, the flowchart in FIG. 5 is not limited to the above steps, and may include other steps. For example, the steps of drawing a financial graphic after determining the financial characteristics and financial varieties belong to the existing technologies and are not described in detail.

A program implementation of a partitioning step and a partitioning manner of the multi-graphic display method according to one embodiment is described in detail below. As described above, since one of the multiple partitioning manners can be used for each partitioning step in the multi-step partitioning, that is, each partitioning step corresponds to one partitioning manner, and therefore, a single-step partitioning object representing a single partitioning step is also an object of a partitioning manner class, that is, a partitioning manner object. There are many kinds of partitioning manners, so there are many kinds of corresponding partitioning manners classes. In that embodiment, a polymorphic process method is used to define a common base class for all partitioning manner classes. Since each partitioning manner corresponds to a single partitioning step, this common base class can be called a single-step partitioning base class, i.e., class SinglePartition Base { . . . }, from which the various partitioning manner classes can be derived.

The single-step partitioning base class contains the following variables that need to be initially set and used in the partitioning process. The number of the target rectangular region to be partitioned, whether the target rectangular region is a rectangular sub-region, and the financial characteristics of the rectangle regions newly generated after partitioning.

Wherein, the numbering of the target rectangular region may be adopted as (M, N), indicating that the target rectangular region is partitioned in the step of number M, and is a newly generated rectangular region of number N. M and N are both counted from 0. For example, the rectangular region of number 3 newly generated in the step of number 2 is numbered as (2, 3). The initial target rectangular region corresponding to the display window is numbered as (−1, 0). The number of the new rectangular region in the target rectangular region may take the upper left corner point of each new rectangular region as the representative point, and the point coordinate is sequentially numbered according to the following principle: the smaller the Y coordinate, the smaller the number. When the Y coordinate is the same, the smaller the X coordinate, the smaller the number is. In short, the dividing manner and the sizing manner are numbered in the order from left to right or from top to bottom according to the partitioning direction. For the grid manner, each line is numbered in the order from left to right first, and then from top to bottom, for example, in the order of the rectangular sub-regions 420 to 439 in FIG. 4. By such numbering, each rectangular region can find the rectangular region of the upper level where it is located until the window is displayed.

The financial characteristics of the newly generated rectangular region after partitioning may be a specific financial characteristic value indicating that the newly generated rectangular region is a financial graphic without further partitioning, or a specific value of a non-financial characteristic. For example −1, it means that the newly generated rectangular region is not a financial graphic and needs to be partitioned again. If the financial characteristic is not set for the newly generated rectangular region after single-step partitioning, the default value of the financial characteristic is −1.

The single-step partitioning base class also includes a single-step partitioning virtual function or a single-step serializing virtual function, which can be achieved according to the specific partitioning manner.

Different partitioning manner classes are derived directly or indirectly from the Singledividing base, for example, the following classes may be defined for the dividing manner:

Class SegmentationPartition: public SinglePartitionBase
{
// Variables related to the dividing manner
Bool m_bXOrY; // Dividing direction
int m_nEqualdividing; // Equalization quantity,
Public:
// Define virtual functions declared in the base class to implement various operations
Virtual void PartitionDestinationRect( ); // single-step virtual functions
Virtual void Serialize ( . . . ); // single-step serialization of virtual functions to implement access operations for single-step partitioning of data
. . .
}

Where, m_nEqualPartition represents the number of partitioning the target rectangular region equally, and determines that the number of newly added rectangular regions after partitioning is m_nEqualPartition−1, which is a variable related to the number of newly added rectangular regions.

For the definition of partitioning manner classes corresponding to a single partitioning step, see the following table:

| partitioning manner class | Base class | A variable in a partitioning manner class that is related to the number of newly added rectangles |
|---|---|---|
| Dividing manner class | SinglePartitionBase | Equally partitioned quantity |
| sizing manner class | SinglePartitionBase | Number of sizes |
| sizing manner class according to financial characteristics | sizing manner class | Number of financial characteristics |
| Grid manner class | SinglePartitionBase | Equally partitioned quantity in X and Y |
| Coordinate manner class | SinglePartitionBase | None |

The variable associated with the number of newly added rectangular regions in each single-step partitioning manner class corresponds to the parameter associated with the number of newly added rectangular regions in the partitioning manner. Setting this variable to a different value in the object of the partitioning manner class results in multiple single-step partitioning manners. By determining the variables related to the number of newly added rectangular regions, each partitioning manner object also determines a single-step partitioning manner.

Figure 9:
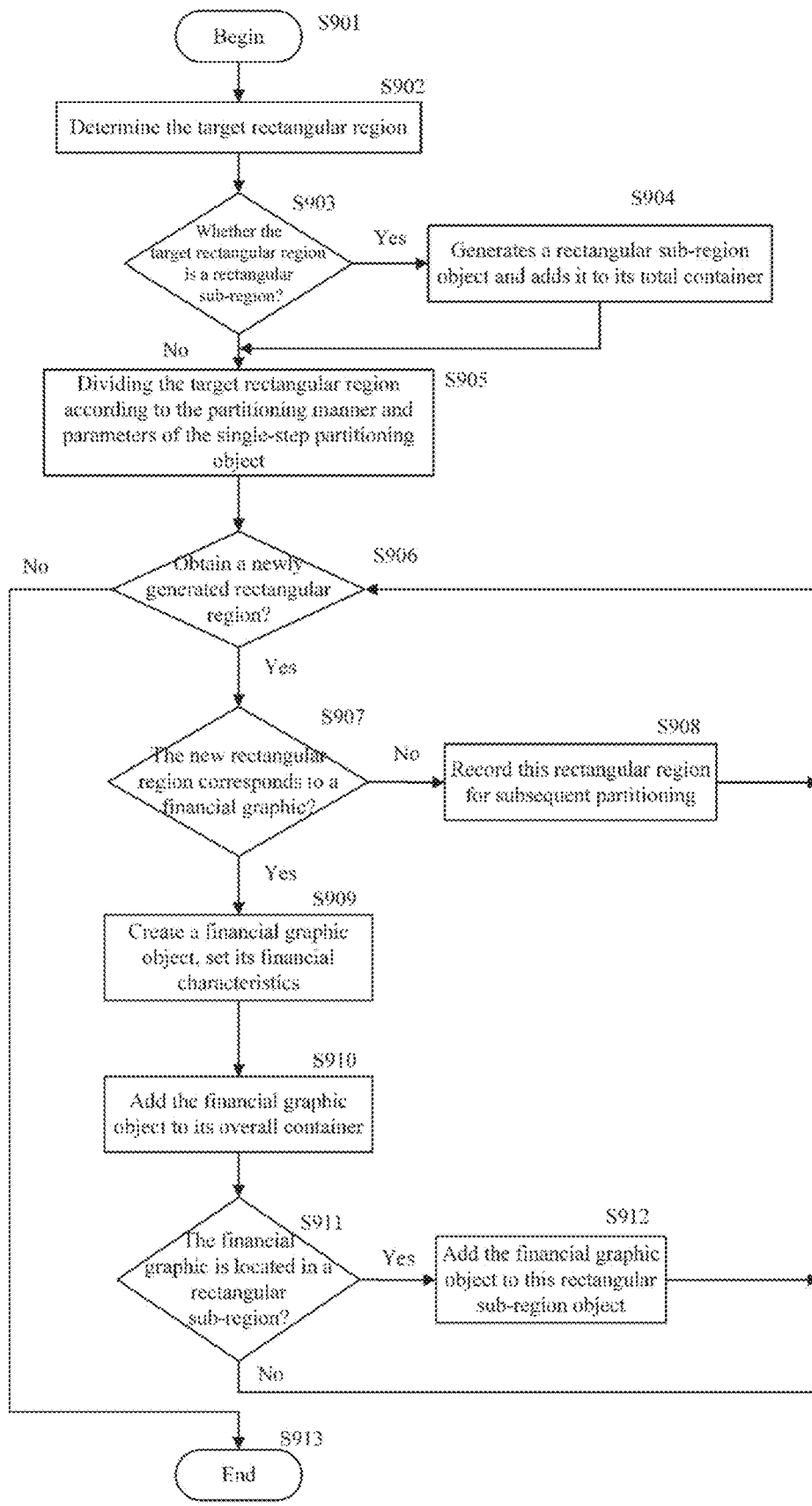
FIG. 9 is a flowchart of a single-step partitioning operation according to an embodiment of the present disclosure.

Each of the above derived classes has to rewrite the virtual function PartitionDestinationRect( ), which is a typical polymorphic application of object-oriented programming. For each single-step partitioning, the specific flow is shown in FIG. 9:

(1) After beginning (S901), a target rectangular region to be partitioned is determined according to the number of the destination rectangular region in the single-step partitioning object (S902).

(2) Judging whether the target rectangular region is initially set as a rectangular sub-region (S903), and if so, generating a rectangular sub-region RectangularSubregion object, Set the member variable m_rectOfSubregion indicating the rectangular region in which it is located to this target rectangular region, and add the rectangular sub-region object to its total container (S904), if not, the process goes directly to step S905.

(3) Partitioning the target rectangular region according to the partitioning manner and the parameters of the single-step partitioning object (S905) to generate a new rectangular region. Reference is made to the description of the partitioning manners shown in FIGS. 6 to 8 in the foregoing step S501.

(4) Determining whether a newly generated rectangular region is obtained (S906).

(5) If the step (4) succeeds, it is judged whether or not the new rectangular region corresponds to a financial graphic by reading the financial characteristics of the new rectangular region (S907). If the conclusion is no, the rectangular region, including its number and position, is recorded for subsequent partitioning (S908), and then the process returns to step S906. If so, a financial graphic object is created and its financial characteristics are set (S909). The newly created financial graphic object is then added to its overall container (S910). Finally, it is judged whether the financial graphic object is located in a determined rectangular sub-region (S911), that is, it is judged whether the target rectangular region or the rectangular region of its upper level is a rectangular sub-region. If yes, the financial graphic is added to the object of the rectangular sub-region (S912), and then the process returns to step S906. If not, the process directly returns to step S906.

(6) Repeating step (4) until all the newly generated rectangular regions are processed, and step S906 returns a negative result, indicating that the single-step partitioning is completed (S913).

The single partitioning step is described above, and the multi-step partitioning process is specifically described below. For multi-step partitioning, the definition of multi-step partitioning classes is as follows:

Class MultiPartitions: public std:: vector<SinglePartitionBase>
{
Public:
Void PartitionAll ( ); // Multi-Step partitioning Function
Void Serialize ( . . . ); // Multi-step serialization function, which calls the single-step serialization virtual function in each single-step partitioning object to realize the whole access of the multi-step partitioning object
}

From the base class of the multi-step partitioning class, we can see that the multi-step partitioning class itself is a container of single-step partitioning objects, which contains one or more single-step partitioning objects. In addition, the multi-step partitioning class also contains a container of financial graphic number groups, which may contain one or more financial graphic number groups, or may be empty. Each financial graphic number group represents a rectangular sub-region which is not determined in the partitioning process and needs to be determined after the partitioning is completed, so the container is called the container of the rectangular sub-region determined after the partitioning. If all of that rectangular region are determined during the partitioning process, the container is empty and does not contain any set of financial graphic numbers. See FIG. 10 for the detailed flow of the implementation of the multi-step partitioning function PartitionAll ( ). After the flow starts (S1001), in the container of the single-step partitioning object, one single-step partitioning object is sequentially obtained, and it is determined whether the process succeeds (S1002). If it succeeds, the virtual function for partitioning the object by one step is called, and the virtual function for partitioning the object by one step is partitioned according to the flow of FIG. 9 (S1003). This process is repeated until all single-step partitioning objects are processed, that is, step S1002 returns NO.

Then, in the containers of the rectangular sub-regions determined after the above partitioning, one financial graphic number group corresponding to the rectangular sub-regions not yet determined is sequentially taken out (S1004), and if successful, a new rectangular sub-region object is created, The financial graphic corresponding to the undefined rectangular sub-region is added (S1005), and the new rectangular sub-region is added to its total container (S1006). This process is repeated until all of the rectangular sub-regions to be determined after partitioning are processed. Finally, it is determined whether there are any financial graphics which do not belong to any of the rectangular sub-regions (S1007), and if there is, it is processed as a single rectangular sub-region (S1008). That is, the financial graphic is added to a newly created rectangular sub-region object and the rectangular sub-region object is added to its container. If not, the process ends (S1009).

When the MultiPartitions object is partitioned using the multi-step partitioning class, one of the characteristics is that the specific single-step partitioning result is determined completely according to the single-step partitioning data including the partitioning manner and parameters. Wherein the single-step partitioning data may be represented by an object, such as the single-step partitioning object in the above multi-step partitioning object, or may not be represented by an object, such as represented in the form of a data structure in C++ language, Or other or even non-structured data that can be identified by the program code and partitioned accordingly as long as the data contain information about the partitioning manners and parameters. In accordance with that flow shown in FIG. 9, the embodiment handle a single partitioning step represented entirely by data, and more particularly by object data, so this method may be refer to as a multi-step partitioning based entirely on partitioning data. Another characteristic of this method is that in a single partitioning step, any one of a number of single-step partitioning manners may be used. Because the partitioning result of the method completely depends on the partitioning data, and the partitioning data can be set in various partitioning manners, including different partitioning manners or different partitioning parameters under the same partitioning manner, corresponding to a variety of partitioning ways. Therefore, the single partitioning step, in step S905 in FIG. 9, for example, may perform partitioning based on data of any partitioning manner determined at the time of initial setting of the single-step partitioning object, such as the partitioning shown in FIGS. 6 to 8. Therefore, any one of multiple single-step partitioning manners can be used for the single partitioning step of the method. The advantage of this method is that the program can deal with the most suitable and efficient single-step partitioning manner selected by the user according to the specific situation.

Figure 24:
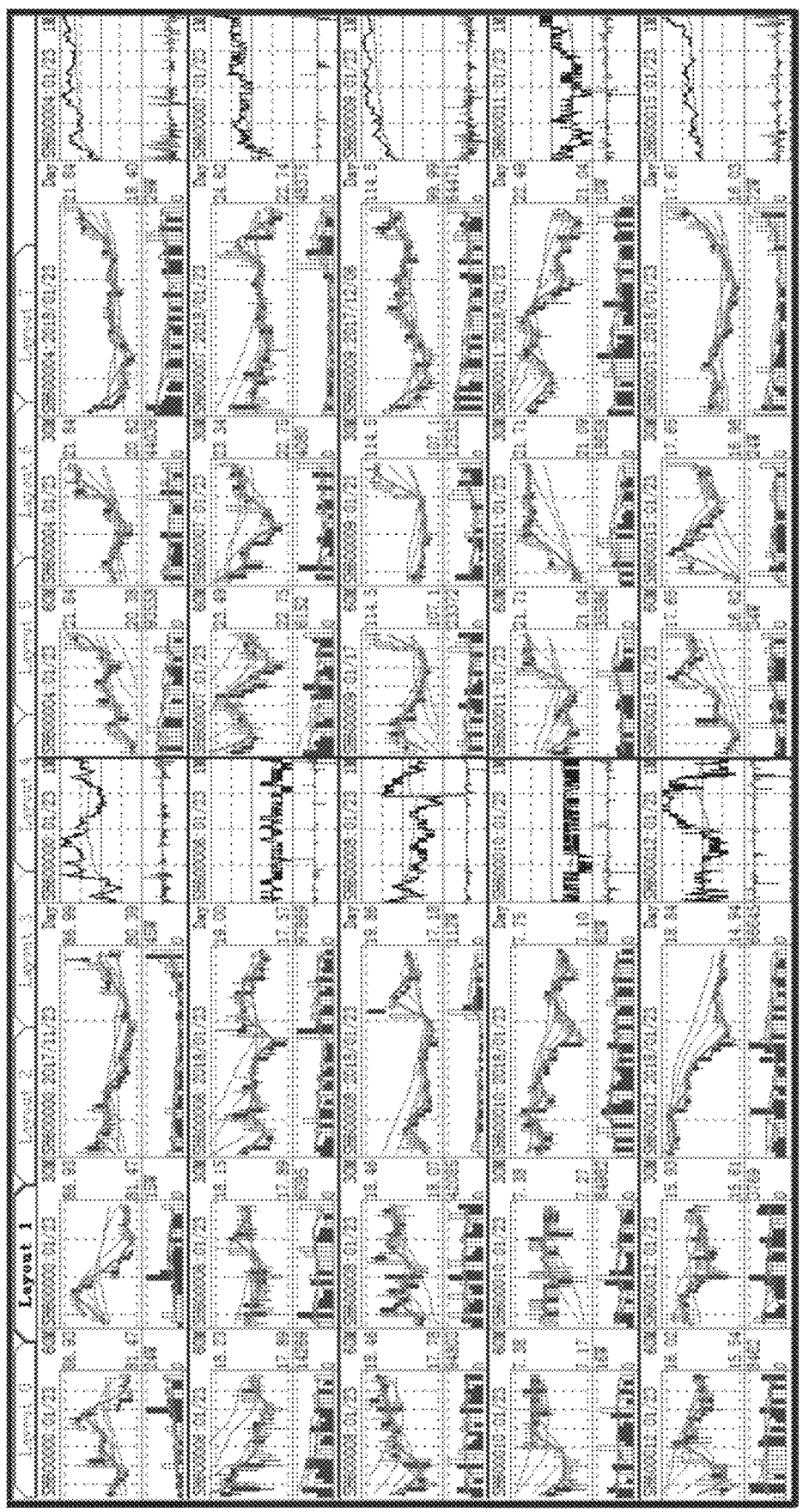

In contrast to that above multi-step partitioning using multi-step partitioning object to realize multi-step partitioning, some specific layouts can be realize by a program flow. For example, as shown in FIG. 24, the following process may be adopted for implementation:

Void Partition GridRectSubregion (int nXCount, int nYCount, std:: vector <int> contFinancialFeature), In which, the input parameters nXCount and nYCount are equally partitioned quantities in the X direction and the Y direction, respectively, and the input parameter contFinancialFeature is an array of financial characteristics of each graphic in a rectangular sub-region.

Figure 11:
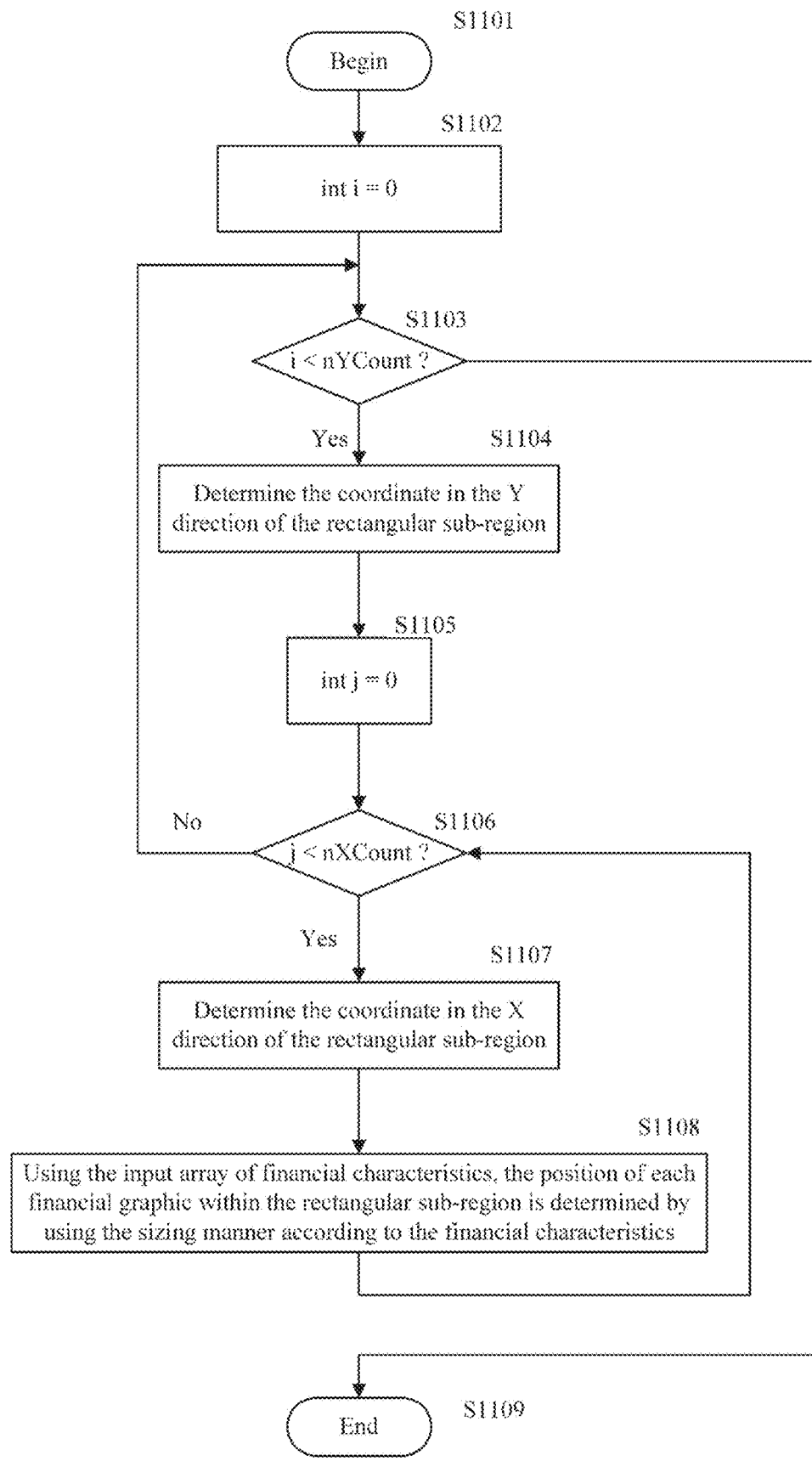
FIG. 11 is a flowchart of a multi-step partitioning operation of a fixed program flow according to an embodiment of the present disclosure.

This function directly uses the code to realize the multi-step partitioning of the combination of multiple partitioning manners. As shown in FIG. 11, after the program is started (S1101), first, a local shaping variable i is set to 0 (S1102). Determining whether i is smaller than nYCount (S1103), and if yes, determining that the coordinate in the Y direction of the rectangular sub-regions are respectively i*(height of display window/nYCount) and (i+1)*(the height of the display window/nYCount). Where "*" denotes a multiplication sign (S1104). If not, the program ends (S1109). Then, the local shaping variable j is set to be 0 (S1105). Determining whether j is smaller than nXCount (S1106), and if yes, determining that the coordinate in the X direction of the rectangular sub-regions respectively are j*(width of display window/nXCount) and (J+1)*(width of display window/nXCount), thereby determining the position of the rectangular sub-region (S1107). If not, the program returns to step S1103. Then, using the input financial characteristic array contFinancialFeature, the position of each financial graphic within the rectangular sub-region is determined using the aforementioned sizing manner according to the financial characteristic (S1108).

In that above position process, the loop process of the variable i is equivalent to the loop process of partitioning nYCount line in the Y direction in the display window by the partitioning manner. The loop process of looping the variable j is equivalent to partitioning nXCount rectangular sub-regions in the X direction of each line by using the partitioning manner again in each of the lines partitioned in the above steps. Then in step S1108, the position of each financial graphic within the rectangular sub-region is determined using the sizing manner according to the financial characteristic. When the processing is completed for each of the rectangular sub-regions, the process ends (S1109).

For example, when it is necessary to draw a graphic similar to FIG. 24, only a simple operation is required, such as by clicking a command on the system menu, to pop up the menu shown in FIG. 14. The parameters nXCount, nYCount are determined to be 2, 5, respectively, according to the number of partitioning of the rectangular sub-regions in the horizontal and vertical directions. Finally, the function of PartitionGridRectSubregion is called to realize the location of each rectangle region and financial graphic.

In the method above, the multi-graphic display of the specific arrangement is simple. One of the characteristic of the method is that the fixed program flow is adopted, and the specific single-step partitioning result is related to the fixed flow. Therefore, it is called the multi-step partitioning of the fixed flow. In the above partitioning GridRectSubregion function implementing this method, the partitioning manner is implemented by code rather than data, so the partitioning manner for a single partitioning step is fixed. Another characteristic of this method is that in a single partitioning step, any one of multiple single-step partitioning manners may be used. Although there is a fixed program flow, if the partitioning manner is fixed, the parameters related to the number of newly added rectangular regions in the partitioning manner, such as the above-mentioned nXCount, nYCount and contFinancialFeature parameters, may also adopt different values. Therefore, it also corresponds to multiple single-step partitioning manners. So, In step S1107 or S1108 in FIG. 11, for example, the single partitioning step may be performed based on the data of any partitioning manner determined by the human-machine interactive menu shown in FIG. 14 on the premise that the partitioning manner is fixed. Therefore, any one of multiple single-step partitioning manners can be used for the single partitioning step of the method. The advantage of this method is that the concrete partitioning manner can be realized directly by code, which is relatively simple to realize, fast to run, and simple to set the parameters in the partitioning manner.

In that above-described embodiment employing the method of partitioning the data entirely on the basis of the data, or in the embodiments employing the method of the fixed flow, it is possible that the partitioning manners of the steps are different, It is also possible that the steps are partitioned in the same way but the variables associated with the new rectangular region are different. In addition, there may be only one partitioning step, which is a special case.

If a plurality of rectangular sub-region are included in that partitioning data or the fixed flow, regardless of whether the multi-step partitioning is completely based on the partitioning data or the fixed flow, and at least one of the rectangular sub-regions has a plurality of financial graphics, then a plurality of rectangular sub-regions are displayed in the display window after drawing, and at least one of the rectangular sub-regions has a plurality of financial graphics, therefore, it is possible to realize the display of multiple financial varieties and a plurality of financial graphics in the display window, thereby improving the browsing efficiency.

Further, if in the above-described partitioning data or fixed flow, if there are more than two rectangular sub-regions containing a plurality of periodic financial graphics, and at least two of the rectangular sub-regions have the same financial characteristics of at least two periodic financial graphics, two or more rectangular sub-regions in the display window after the drawing respectively contain a plurality of periodic financial graphics, and at least two of the rectangular sub-regions have the same financial characteristics between them, the same-screen comparison of the financial graphics of multiple periodic of a plurality of financial varieties is realized, and have a comprehensive and efficient contrast effect.

Alternatively, if only one rectangular sub-region has a plurality of periodic financial graphics in the above-described partitioning data or fixed flow, and one or more other rectangular sub-regions are dynamically associated with the rectangular sub-region, only one rectangular sub-region having a plurality of periodic financial graphics within the display window after drawing, there is only one periodic financial graphic within all of the other rectangular sub-regions, and the one or more other rectangular sub-regions are dynamically associated with this rectangular sub-region, then, as previously described, a rapid comparison of financial graphics of multiple periodic of financial varieties can be realized, and has a comprehensive and efficient contrast effect.

Further, in the above multi-step partitioning process, there is at least one step of adopting one of a dividing manner, a sizing manner or a grid manner, and adding a plurality of rectangular regions after partitioning. As shown in FIG. 12, 1200 is a target rectangular region having a length in the X direction of 1400, and the inside thereof is partitioned into four rectangular regions having lengths of 300, 400, 300 and 400, respectively. The first partitioning manner is to partition the newly generated rectangular regions 1210, 1220 into two rectangular regions 1211, 1212 and 1221, 1222 respectively by using a sizing manner. As shown in FIG. 13. In this method, there are three partitioning steps and five partitioning data needs to be prepared. The second partitioning manner is to partition four rectangular regions as shown in FIG. 13 in one step by only using the sizing manner and only preparing four size data. The second method is obviously superior to the first method both in the partitioning steps and in the amount of data preparation. If that graphic is more complex and more numerous, the advantage is more obvious. For example, for the partitioning of the grid manner employed in FIG. 8, only two partitioning parameters are needed, and a single partitioning step adds 10−1=9 rectangular regions. In the at least one single-step partitioning step of the multi-step partitioning, since the single partitioning step may use any one of multiple single-step partitioning manners in the multi-step partitioning, a suitable partitioning manner such as one of a dividing manner, a sizing manner or a grid manner is adopted, and its parameters are set to values capable of adding a plurality of rectangular regions. It is possible to divide the virtual function of the object by a single step in a single partitioning step, and more specifically, in step S905, a plurality of rectangular regions are added and the partitioning step is reduced. Therefore, on the one hand, the program running efficiency is improved, and on the other hand, the amount of data preparation work of the user can be reduced, and the partitioning data can be set in a more direct and flexible manner.

Next, an initial setting about for the partitioning data is described.

The final layout of financial graphics and rectangular sub-regions is predetermined by the user, and then converted into digital layout information, that is, the initial partitioning data, which is also the partitioning data actually used in the partitioning process. The formation of the initial partitioning data includes the following several embodiments:

The first is the use of built-in partitioning data. A user just needs click the menu, button or label during operation, a multi-graphic drawing can be realized, which is especially convenient. The snapshots of FIGS. 3, 4, and 24 of the present disclosure correspond to the "Layout 5," "Layout 3," and "Layout 1" labels at the upper portion of the display window, respectively, that is, labels with layouts of 5, 3, 1, respectively, and so on. This method can be applied to the common financial graphic layout and is the most convenient for the user. For example, for the snapshot in FIG. 24, the implementation could be as follows: in the above-mentioned PartitionGridRectSubregion function, the parameters nXCount and nYCount are respectively 2 and 5, and the contFinancialFeature array is 60M, 30M, Day and 1M, all of which are built-in fixed values. Alternatively, a built-in multi-step partitioning object is set, which successively has one single-step partitioning object with 5×2 grid manner partitioning, and ten identical single-step objects with a sizing manner according to financial characteristics and with financial characteristics of 60M, 30M, day, 1M. These two methods are respectively corresponding to the fixed flow and the multi-step partitioning based entirely on the partitioning data. Both of these methods can themselves use any one of multiple single-step partitioning manners, and thus, at the programming stage, these built-in data settings can be arbitrary, or any one of multiple partitioning manners may also be used. However, after the program is compiled, due to the built-in fixed restriction of partitioning manners and parameters, the actual runtime can only use a fixed one of multiple single-step partitioning manners in a single partitioning step. Further, in at least one partitioning step, a partitioning manner may be set to one of a dividing manner, a sizing manner or a grid manner, and a parameter thereof may be set to a value capable of adding a plurality of rectangular regions, thus, a plurality of rectangular regions can be added after partitioning.

Second, it can also be realized by a method of reading an external file. The partitioning data with or without the partitioning manner information can be read from an external file. In an embodiment for multi-step partitioning by using a multi-step partitioning object, for example, that serialization function in the multi-step partitioning class MultidPartitions: Serialize can write out the contents of the object of the class to an external storage medium in a certain format, such as files on a local hard disk or a hard disk connected via a network, and then read from them in the same format. Therefore, if the data format of other external files conforms to the function's serialized storage format, the function can also read the file and generate a multi-step partitioning MultiPartitions object. Therefore, the single partitioning step in the initial partitioning data in the external file corresponds to the single-step partitioning object in the multiPartitions object, and thus can be the same as the single partitioning step of the multi-step partitioning object in the program. Any of multiple single-step partitioning manners can be used. Further, in the initial partitioning data in the external file, at least one single-step partitioning manner corresponding to one partitioning step is one of a dividing manner, a sizing manner or a grid manner, and a parameter thereof is set to a value capable of adding a plurality of rectangular regions so that a plurality of rectangular regions can be added after partitioning.

Figure 15:
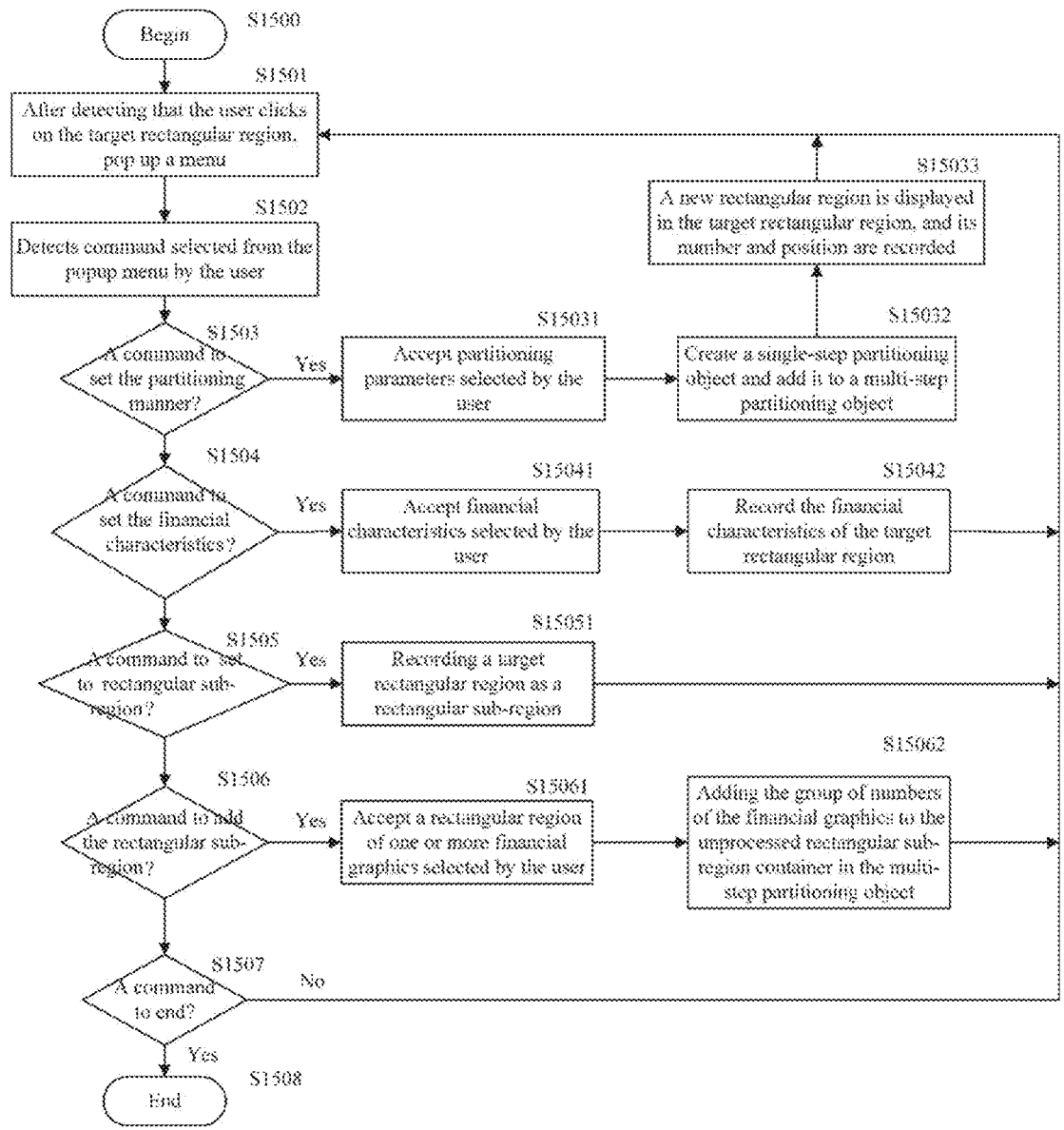
FIG. 15 is a flow chart of forming initial partitioning data through human-machine interaction according to an embodiment of the present disclosure.

Thirdly, the initial partitioning data can be formed through human-machine interaction. For example, in the embodiment of multi-step partitioning in which the single-step partitioning manner is optional, the following method as shown in FIG. 15 may be adopted:

1. After beginning (S1500), the user first selects the target rectangular region, such as clicking the inner region, and the program detects that the user clicks the target rectangular region (S1501), and pops up a menu 1600 as shown in FIG. 16. The program then detects a command issued by the user through the menu item selected in the menu (S1502).

2. The program first judges whether the command is a command for setting a partitioning manner (S1503). If yes, it indicates that the user selects one of the partitioning manners 1601 to 1605 on the pop-up menu 1600. The program then pops up a menu corresponding to the selected partitioning manner as shown in FIG. 17, and accepts parameters seted by the user in this partitioning manner (S15031). The program creates a single-step partitioning object with the SinglePartitionBase as the base class according to the schema and parameters, and adds the single-step partitioning object to the object of the multi-step partitioning (S15032). The partitioning manners and parameters thereof recorded in this step are used in the step S905 of FIG. 9. Finally, the program divides the rectangular region selected in the above-mentioned first step according to the inputted partitioning manners and parameters, displays the newly partitioned rectangular region, and records the number and the position thereof (S15033). The number may be used in step S902 in FIG. 9, and the position may be used to determine the target rectangular region selected by the user in step S1501 in the subsequent operation of the flow.

Figure 6:
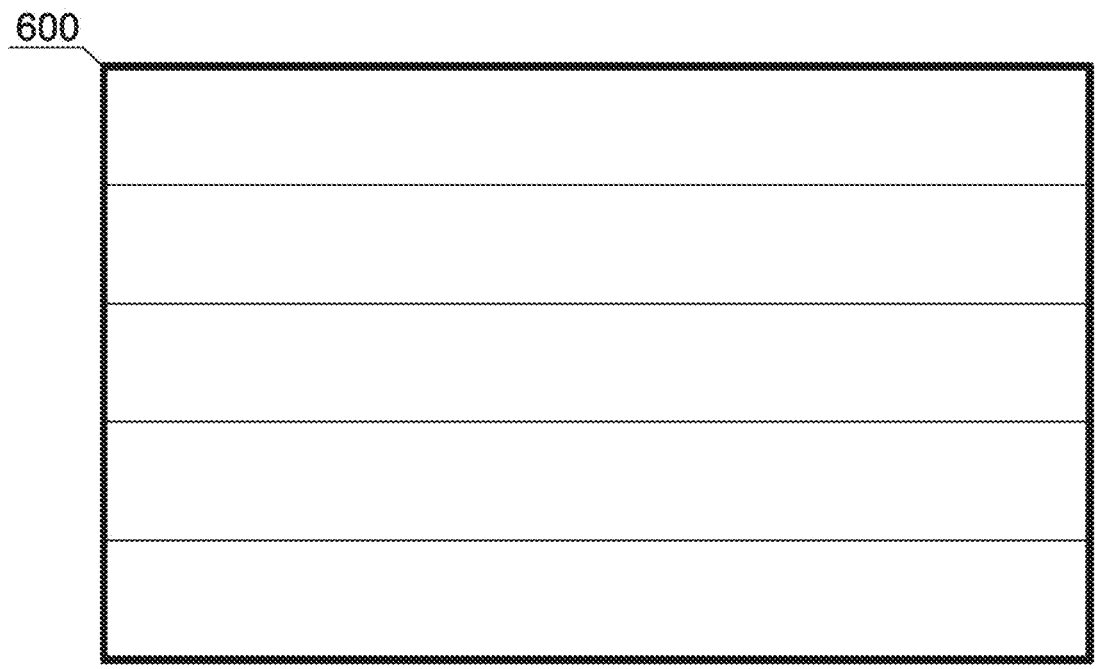
FIG. 6 is a schematic diagram of the dividing manner used in a single partitioning step according to an embodiment of the present disclosure.
Figure 8:
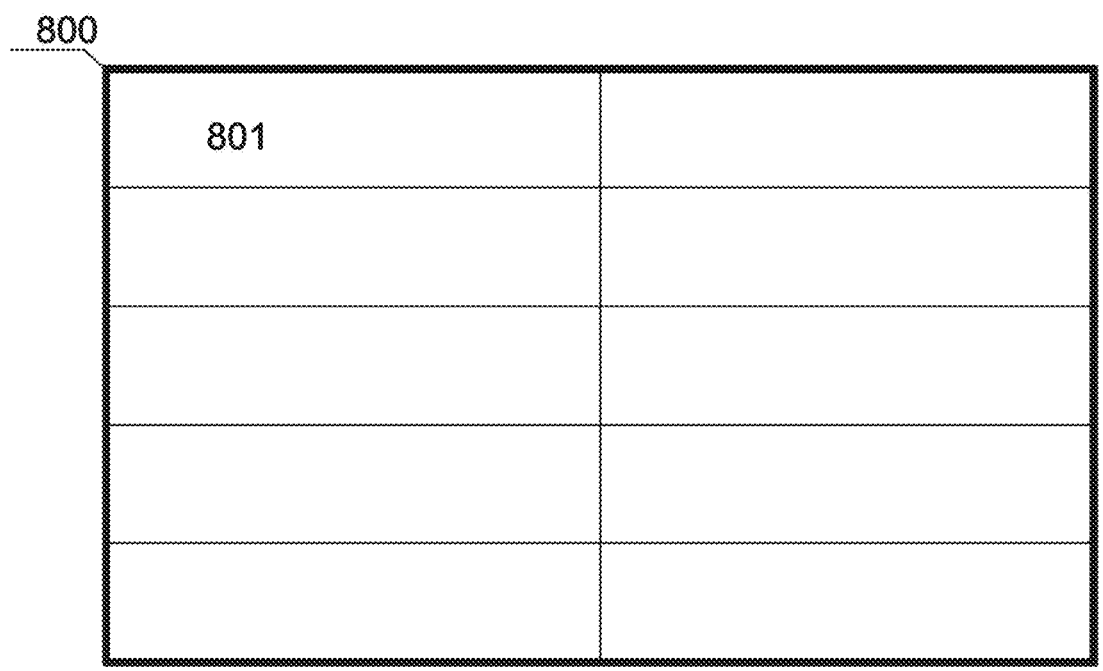
FIG. 8 is a schematic diagram of the grid manner used in a single partitioning step according to an embodiment of the present disclosure.

For example, if item 1601 "dividing manner" on the menu is selected in step S1502, the program pops up a dividing manner setting window shown in 1710 in FIG. 17, and after setting parameters, the program can form the partition shown in FIG. 6. If that item "sizing manner" is selected 1602, the program pops up a sizing manner set window shown at 1720, or selects 1603 item "Sizing manner according to financial characteristics", a sizing manner setting window according to the financial characteristics shown at 1730, pops up. After setting the parameters, the program can be partitioned as shown in FIG. 7. If item 1604 "grid manner" is selected, the program pops up a grid manner setting window shown at 1740, and after setting parameters, the program can form a grid-like partition as shown in FIG. 8. For another example, when item 1605 "coordinate manner" is selected, the program pops up the coordinate manner setting window shown in 1750, and after setting the appropriate coordinates, the program can generate a new rectangular region in the target rectangular region.

3. If the program detects that the user selects 1606 menu item "Set financial characteristics" on the menu 1600 (S1504), a menu listing all financial characteristics pops up, and accepts a financial characteristic selected by the user from the menu (S15041). The program records the financial characteristic as the financial characteristic of the target rectangular region (S15042). For example, after the user selects a specific financial characteristic, the program first determines the number of the target rectangular region, such as (1, 2), indicating that the target rectangular region is a rectangular region with the number 2 generated in the step with the number 1. Then, the single-step partitioning object with sequence number 1 is found, and the financial characteristic of the newly generated rectangular region with sequence number 2 is set as the financial characteristic input by the user. The data recorded at this step is used for steps S907 and S909 in FIG. 9.

4. If that program detects that the user selects 1607 menu item "Set as rectangular sub-region" on the pop-up menu 1600 (S1505), the program records the target rectangular region as a rectangular sub-region (S15051), The recorded data may be used to set a single-step partitioning object created for this rectangular sub-region in a subsequent step, and may also be used in step S903 in FIG. 9.

5. If the program detects that the user selects 1608 menu item "add a rectangular sub-region" on the pop-up menu 1600 (S1506), the program will prompt the user to enter a rectangular region where one or more financial graphics are located (s15061). Then, a group of financial graphic numbers corresponding to the selected financial graphics is added to the containers of the rectangular sub-regions determined after partitioning in the multi-step partitioning object (S15062). The data recorded in this step is used in steps S1004 and S1005 in FIG. 10.

6. If the program detects that the user selects 1609 menu item END on the pop-up menu 1600 (S1507), the partitioning setting is ended (S1508), otherwise it returns to step S1501.

After steps 2-5 are completed, it returns back to step 1. By combining step 1 with step 2, step 3, step 4, or step 5, the multi-step initial setting of the Multi Partitions object is completed. The completed MultiPartitions object can be used directly to draw graphics, where financial varieties can be set by default. It can also be stored in an external file in the foregoing manner, and after that, the initial setting of multi-step partitioning objects can be completed by reading this file, and then drawing graphics can be performed.

The above-mentioned human-machine interaction flow produces the initial partitioning data of partitioning manner information, which is suitable for all kinds of layout, but it is also complex to set up. For certain layouts, a simple human-machine interaction may be used, such as the window of FIG. 14 described above. The user only needs to input the nXCount and nYCount parameters in the grid manner and the financial characteristic parameters in the sizing manner according to the financial characteristic. After these partitioning data are obtained inside the program, the partitioning can be carried out using the aforementioned method.

As can be seen from the above man-machine interaction implementation process, when a single partitioning step is set, the partitioning manner and parameters can be set at the same time, or only the partitioning parameter under the fixed partitioning manner can be set to use any of multiple single-step partitioning manners. Further, setting at least one single-step partitioning manner as one of a dividing manner, a sizing manner or a grid manner, and setting the parameter thereof to a value capable of adding a plurality of rectangular regions, thus a plurality of rectangular regions can be added after partitioning.

After the positions of the financial graphic and the rectangular sub-regions are determined, there are different embodiments when drawing the boundaries of the financial graphic.

In the snapshots of the embodiments shown in FIGS. 3 and 4, there are common boundary lines between the financial graphics, i.e., the same boundary is shared by adjacent financial graphics. In this case, the financial graphic and the boundary line are drawn directly by a drawing function of a window containing a plurality of financial graphics, such as a display window. Otherwise, the financial graphic is drawn by a drawing function of a sub-window of the same size and having no boundary line of its own, and the common boundary line of the financial graphic may be uniformly drawn by a window containing a plurality of financial graphics, such as a display window. In this case, since the boundary line can be shared by two adjacent graphics and its drawing can be controlled by a program such that its lines are thin, such as one pixel, the region occupied by the boundary line within the display window is small, thus, more financial graphics can be drawn. This effect is more obvious when there are more than ten pieces of financial graphics in the display window.

Figure 18:
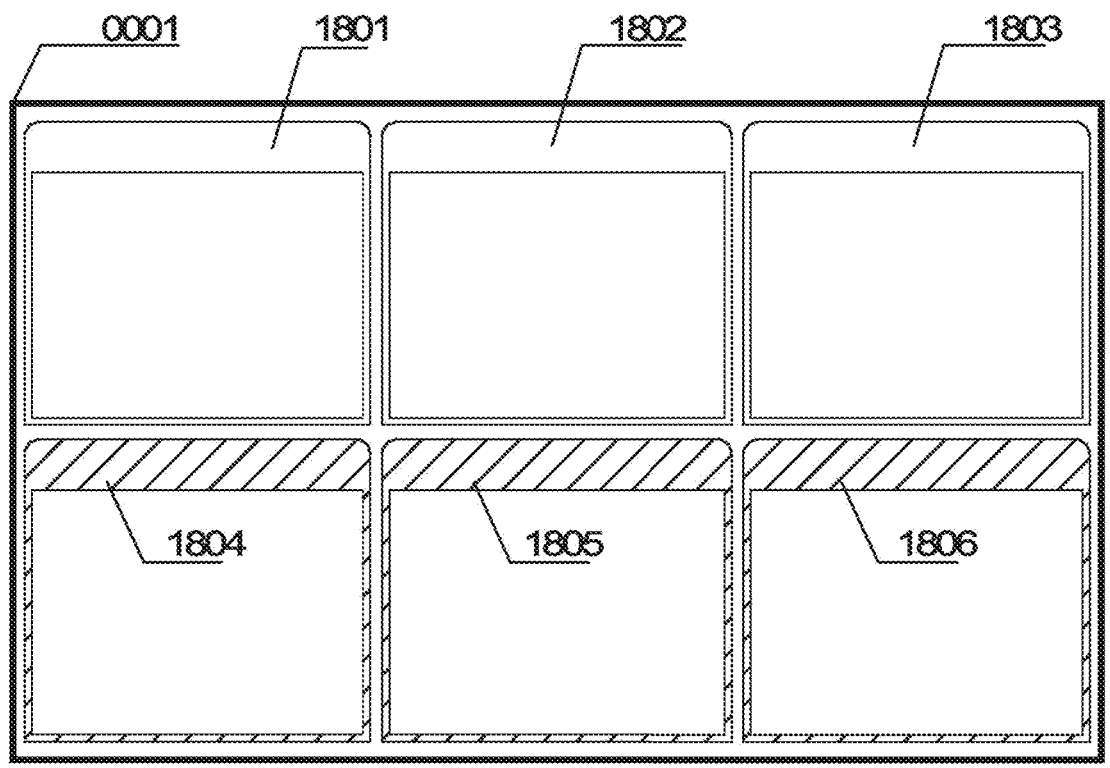
FIG. 18 is a schematic diagram of a rectangular sub-region and a boundary line of a financial graphic according to an embodiment of the present disclosure.

For another example, in FIG. 18, each financial graphic has a boundary line. If the financial graphic of 1801 in the graphic is dragged, its boundary line moves together and does not affect the other financial graphics and the boundary line. In this case, the financial graphic is drawn by the drawing function of a sub-window of the same size and with its own boundary line. However, unlike the above-mentioned common boundary line, since the width or the style of the boundary line carried by the sub-window is usually control by the operating system, the lines are generally thick, and there are two boundary lines between adjacent graphics. Therefore, the region occupied by the boundary lines in the display window is larger, so that more financial graphics cannot be drawn.

In another embodiment, the range of the rectangular sub-region needs to be further highlighted as a whole, so a method of enhancing the boundary line of the rectangular sub-region is adopted.

In the case where the financial graphic inside the rectangular sub-regions all have a common boundary line, such as in the embodiment snapshots shown in FIG. 3, 4, the common boundary line between the rectangular sub-regions, compared with the boundary line of the financial graphic inside, the user can quickly distinguish the whole region where the financial graphic of the same financial variety is located by drawing the public boundary line with thicker lines and distinguish different financial varieties more quickly and clearly for comparison. Meanwhile, in other embodiments, the common boundary lines of the rectangular sub-regions may also be drawn with lines of different colors, or lines of different colors and thicker.

In the implementation of boundary enhancement, the difficulty lies in how to determine the boundary of the rectangular sub-region in the display window with 20 or 30 or more graphics. Since the embodiments herein employ a rectangular sub-region solution, it is easy to solve this problem. Either the container method or the static association method can be used to determine the position of the rectangular sub-region according to the method described above. In addition, when drawing graphics within the entire display region, to prevent duplication, boundary lines on the right and lower sides of each rectangular sub-region may be drawn. When a single rectangular sub-region needs to be redrawn when the financial variety changes, all the boundary lines will be drawn.

Figure 19:
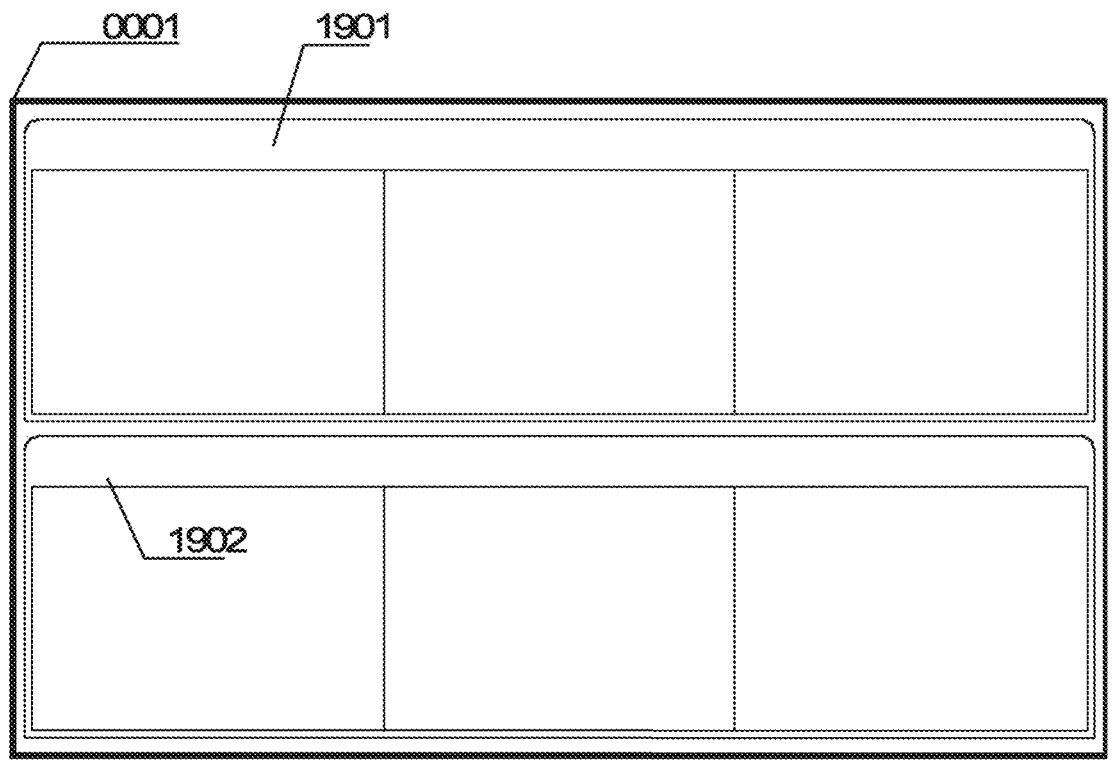
FIG. 19 is another schematic diagram of a rectangular sub-region and a boundary line of a financial graphic according to an embodiment of the present disclosure.

In another embodiment shown in FIG. 19, the rectangular sub-regions 1901, 1902 within the display window 0001 are themselves sub-windows with boundary lines of width or style controlled by the operating system, Its window drawing function is responsible for drawing the common boundary line of the internal financial graphic. The two kinds of boundary lines are different in thickness and color, so the window in which the rectangular sub-region itself is located in this way has the overall effect of highlighting.

In the case where all of the financial graphics within the rectangular sub-region do not have a common boundary line, for example, in the display window 0001 shown in FIG. 18, the sub-windows 1801 to 1803 are a rectangular sub-region, and the boundary line is of one color. The sub-windows 1804 to 1806 are another rectangular sub-region, and the boundary line is of another color. In either of that above sub-window, there is only one financial graphic, that is, all the financial graphics are provided with boundary lines, or the inside of the at least one sub-window contains a plurality of financial graphics, due to the boundary line of the sub-window inside one rectangular sub-region is different in color from the boundary line of the sub-window inside another rectangular sub-region, that is, the boundary line of the financial graphic inside different rectangular sub-regions is different in color, hence, the above two can be clearly distinguish as a whole.

To summarize the above, in order to highlight the overall scope of the rectangular sub-regions, the boundary lines between the rectangular sub-regions are drawn so that compared to the boundary lines between financial graphics inside the rectangular sub-region, the lines between the rectangular sub-regions are thicker and/or of different color, or, the color of the boundary line of the financial graphic in the same rectangle sub-region is the same, and the color of the boundary line of the financial graphic in different rectangle sub-region is different.

Other embodiments of the present disclosure are further described below.

The combined rectangular sub-region is described first.

Due to the limitation of the display region or financial characteristics, a plurality of financial graphics belonging to the same financial variety may not be located in the same rectangular region, for example, in an L-shaped region. It requires to be assigned to a plurality of rectangular sub-regions. However, since the financial variety of the financial graphic inside a plurality of rectangular sub-regions needs to be consistent, a plurality of rectangular sub-regions can be combined.

The static association method can be used to realize the combined rectangular sub-region. In one embodiment, the rectangular sub-region is implemented using a container method, and similar to the static association of financial graphics described above, a plurality of rectangular sub-regions objects can be statically associated to realize a combined rectangular sub-region. Taking the snapshot shown in FIG. 3 as an example, the m_pSubregionOfStaticRelating pointer related to the static association is set in the rectangular sub-region object, and the pointer is set to connect the rectangular sub-regions 31, 34 and 35 in a closed-loop manner to form the static association. When the financial variety code of one of the rectangular sub-regions, such as the rectangular sub-region 34, is set, the other two rectangular sub-regions 35, 31 are successively found by the pointer, and the same setting is made.

The combined rectangular sub-region can also be implemented by the container method. In another embodiment, the combined rectangular sub-region object is created directly from the definition of the RectangularSubregion class described above. The object inner m_contOfFinancialChart member variable contains the object of all the financial graphics within the combined rectangle sub-regions. In addition to that fact that the m_rectOfSubregion member variable is no longer use because it is not a rectangle, and the fact that the static association pointer m_pSubregionOfStaticRelating is invalidate due to the container method, for example, the operations such as setting of financial varieties and drawing of internal financial graphics are the same as those of rectangular sub-region objects.

Further, the range in which the combined rectangular sub-region itself is located may also be highlighted.

Figure 20:
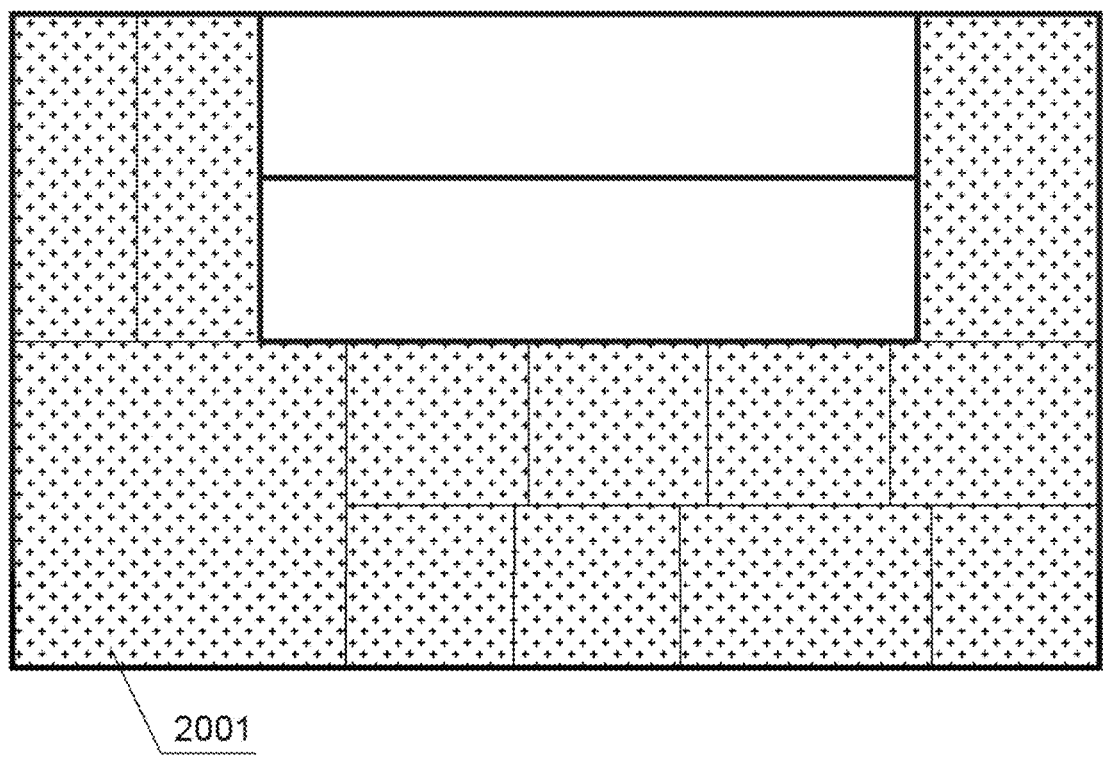
FIG. 20 is a schematic diagram of a combined rectangular sub-region according to an embodiment of the present disclosure.

In an embodiment in which the financial graphics employ a common boundary line, the shaded region 2001 enclosed by thick lines as shown in FIG. 20 is a combined rectangular sub-region into which the rectangular sub-regions 31, 34 and 35 in FIG. 3 are merged. The boundary line of the rectangular sub-region inside thereof is not highlighted. In order to highlight the region 2001, the boundary line position of the combined rectangular sub-region is determined and then drawn using a line that is thicker or different in color than the boundary line of the internal financial graphic. The method of determining the boundary line of the combined rectangular sub-region is as follows. In an embodiment in which that combine rectangular sub-regions are implemented by using a static correlation method, each boundary line of each inner rectangular sub-region is compared with all boundary lines of all other inner rectangular sub-regions. The portions which do not overlap are determined and recorded. Finally, all the boundary lines which do not overlap are recorded, i.e., the boundary lines at the periphery of the combined rectangular sub-region. In the embodiment of realizing the combined rectangular region by using the container method, the boundary calculation method of realizing the combined rectangular region by using the static association method is simply modified. The rectangular sub-regions in the calculation method are directly replaced by financial graphics in the container method. Obviously, in the process of calculating the boundary of the combined rectangular sub-region realized by the static association method, the rectangular sub-region is used to determine the boundary without overlap instead of the financial graphic, and the rectangular sub-region contains a plurality of financial graphics. The rectangular sub-region must be fewer in number than the financial graphic and the calculation is faster.

For the combined rectangular sub-region, the inner rectangular sub-region may also be highlighted as shown in FIG. 3. Since the number of graphics in the combined rectangular sub-region is large, the visual effect is also good by partitioning or classifying a plurality of financial graphics by highlighting the inner rectangular sub-region.

In one embodiment in which that financial graphic has a boundary line, similar to FIG. 18, the boundary line of all the financial graphics within the combined rectangular sub-region are of the same color. The color of the boundary line of the internal financial graphic of the independent rectangular sub-region which does not belong to any combined rectangular sub-region is different from that of the other combined rectangular sub-regions, so that different rectangular sub-regions can be distinguished.

In summary, to highlight that overall scope of the combined rectangular sub-regions, the boundary line between the combined rectangular sub-regions are drawn so that compared to the boundary lines between financial graphics inside the combined rectangular sub-region, the lines between the combined rectangular sub-regions are thicker and/or of different color. Or, the color of the boundary line of the financial graphic in the same combined rectangle sub-region is the same, and the color of the boundary line of the financial graphic in the different combined rectangle sub-region is different.

The dynamic association between the rectangular sub-regions according to an embodiment of the present disclosure is described below with reference to FIG. 4.

The processing unit 101 may execute instructions to set the source rectangular sub-region in dynamic association with the target rectangular sub-region. The dynamic association is similar to the static association mentioned above in that the financial graphic information of the source rectangle sub-region is transferred to the target rectangle sub-region, and the same setting is made within the target rectangle sub-region. The financial graphic information includes at least one of the following: a financial variety code, a set of financial varieties, or a last display time.

The most significant difference between dynamic association and static association lies in the timing of transferring financial graphic information. Static association is that the program automatically transfers the financial graphic information when the source rectangle sub-region is set, while dynamic association is that after the source rectangle sub-region has been drawn, when the command to change the financial graphic information of the target rectangle sub-region is issued through human-machine interaction operation on the financial graphic of the source rectangle region, the financial graphic information is transferred to the target rectangle sub-region. A snapshot of one embodiment of dynamic association is shown in FIG. 4, which was previously described in detail. The program implementation of dynamic association is as follows:

1. Setting a source rectangular sub-region to be associated with a target rectangular sub-region, For example, the RectangularSubregion:: m_pSubregionOfDynamicRelating member variable pointer within the object in the source rectangular sub-region 420-439 in FIG. 4 is set to point to the dynamically associated target rectangular sub-region 410.

2. when a command to change the financial graphic information of the target rectangular sub-region is issued by a human-machine interaction operation on the financial graphic within the source rectangular sub-region is detected, such as detecting a dynamically associated command issued by a user through a click operation on the first financial graphic of the rectangular sub-region 425, the target rectangular sub-region 410 is set using the financial graphic information provided by the financial graphic of the source rectangular sub-region 425, such as within the source rectangular sub-region object:

Std:: String strsourceCode="SH600009"; // obtain the financial variety code of the source rectangle sub-region 425 as SH600009;

m_pSubregionOfDynamicRelating→SetCode (strSourceCode); // Set the financial variety code of the dynamically associated rectangular sub-region 410.

In this way, the financial variety information of the source rectangular sub-region 425 is transferred to the dynamically associated target rectangular sub-region 410. Of course, other financial information such as the last display time and the collection of financial products may also be transferred.

3. Redraw the target rectangle sub-region. For example, a new financial variety is adopted, and the target rectangle sub-regions are redrawn to display the financial graphics of the new financial variety.

In another embodiment, the source rectangular sub-region and the target rectangular sub-region may also be located in different display windows. Further, two display windows may be located in two display units.

Embodiments in which rectangular sub-regions are associated with a set of financial varieties are described below.

In another embodiment, the processing unit 101 may execute instructions to set the rectangular sub-regions to be associated with the set of target financial varieties. The collection of financial varieties, also called a plate, is realized by a container of financial varieties in the embodiment to facilitate the management of financial varieties. In the case of detecting that an operation command to browse the financial variety within the set is performed on the rectangular sub-region, the financial varieties of all the financial graphics within this rectangular sub-region are set to the financial varieties within the set adjacent to the current financial variety of the rectangular sub-region.

When the program is implemented, the m_strOfAssembly variable in the definition of RectangleSubregion can be set, which means the name of the set of the target financial varieties associated with the rectangular sub-region. The name of the set may be preset in the program or modified through a human-machine interaction. For example, in the embodiment of the snapshot of FIG. 3, a certain graphic within the rectangular sub-region 35 is left-clicked. Then a collection of associated financial varieties is selected, such as "Block B," from the pop-up menu. Then in the snapshot of FIG. 3, the rectangular sub-region 35 shows that the current financial variety is the financial variety with sequence number 0 in the panel Block B. After the user issues a backward browsing command, such as moving the mouse into any of the financial graphics in the rectangular sub-region 35 and scrolling the mouse wheel backward, the program receives the command, takes out the financial variety that is adjacent to the current financial variety, such as the financial variety with sequence number 1, from the block B, and then calls the SetCodeAll function of the rectangular region object with the financial variety. The rectangular sub-region 35 will display the financial variety. Then, the user scrolls the mouse wheel forward, issues a forward browsing command, and the program, after receiving the command, takes out the financial variety adjacent to the front of the current financial variety, such as the financial variety with sequence number 0, from the block "Block B". This financial variety then calls the SetCodeAll function of the rectangular sub-region object, and the rectangular sub-region 35 will again display the financial variety with the sequence number 0.

Embodiments of history playback are described below.

The financial graphic is drawn from financial data related to time. Financial data include transaction data, one-minute data and daily data generated in transactions, which always correspond to a time range, such as the time from the launch of financial varieties to the current trading time. The last display time of the periodic graphic, that is, the time corresponding to the rightmost graphic element, corresponds to the last financial data within this time range by default. Similarly, the non-periodic graphic also displays the last financial data by default. Therefore, in general, the final display time of the financial graphic need not be determined separately.

Historical playback is available in cases where a reviewing or learning is required to improve the level of trading. Historical playback is to advance the setting of the last display time of financial graphics to view historical trends. In prior arts, historical playback of a single financial graphic can be performed. However, for a plurality of financial graphics belonging to the same financial variety within the same rectangular sub-region, in order to comprehensively review the historical status, it is necessary to set the same last display time for at least a plurality of periodic graphics including time-sharing graphics and K-line charts through simple operations, so as to perform history playback synchronously.

Figure 21:
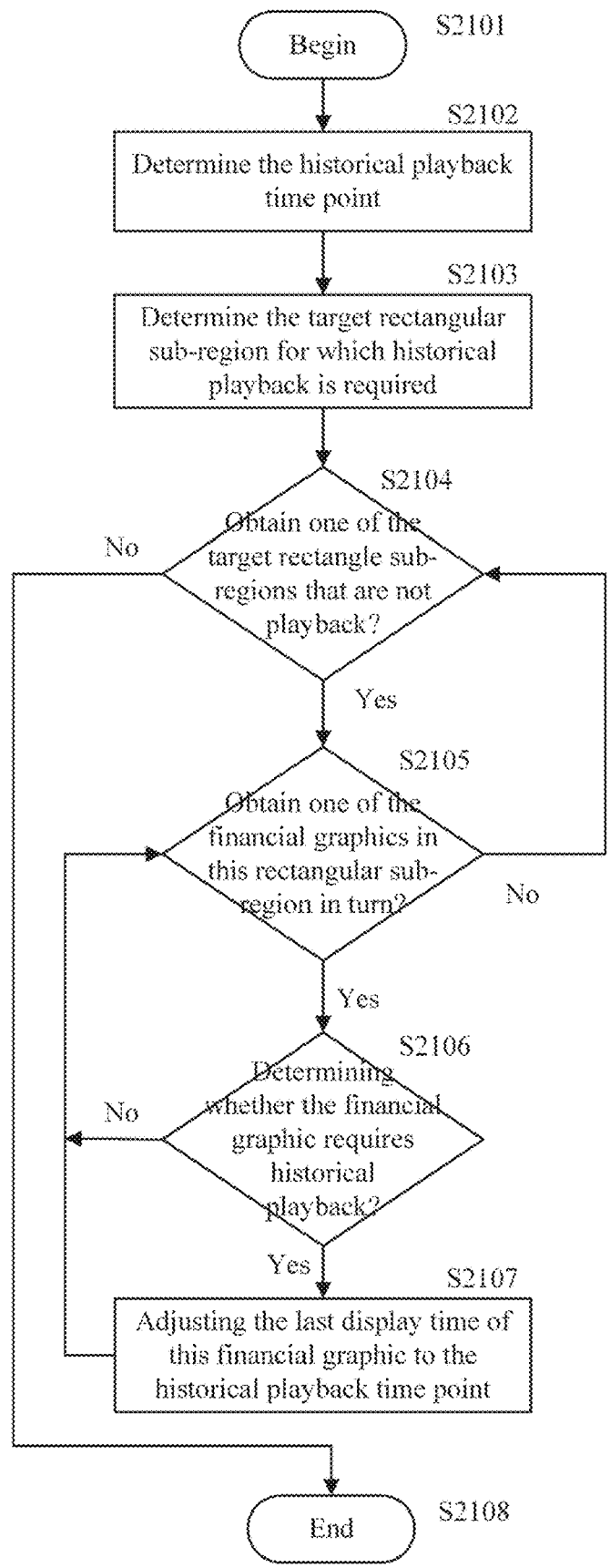
FIG. 21 is a flowchart of a historical playback operation according to an embodiment of the present disclosure.

The processing unit 101 also executes instructions to set the historical playback, for the specific flow, see FIG. 21. First, the user issues a historical playback command (S2101), for example, clicks the non-last K line on the K line chart, and selects the historical playback command on the pop-up menu. The time point of the historical playback is then determined (S2102), such as the end time of the K line, or a window is popped up to accept the history time directly set by the user. Thereafter, a target rectangular sub-region requiring historical playback is also determined (S2103), which is generally a rectangular sub-region in which the K line chart is located, or a plurality of rectangular sub-regions in the combined rectangular sub-region in which the K line chart is located. One of the target rectangular sub-regions that has not been played back is obtained (S2104), if successful, one financial graphic within the rectangular sub-region is sequentially obtained (S2105), and then it is determined whether the financial graphic requires a historical playback (S2016). Whether the historical playback is required may be preset. For example, all periodic graphics can be set with a need to be played back. If playback is required, the last display time of this financial graphic is adjusted to the time point of the historical playback (S2107). After the setting of one rectangular sub-region is completed, the next rectangular sub-region is obtained (S2104) until the setting of all the rectangular sub-regions is completed (S2108). In this section, S2104-S2107 is an embodiment of adjusting the last display time of the target financial graphic within the target rectangular sub-region to the historical playback time point.

In another embodiment, where the financial characteristics of some consecutively arranged graphics within the rectangular sub-region are the same, it is also possible to set the last display time of these graphics to be different. For example, the last display time of a plurality of time-sharing graphics arranged consecutively may be set as consecutive trading days. Three consecutive time-sharing graphics as in the rectangular sub-region 35 in FIG. 3 are time-sharing graphics of three consecutive trading days. At the time of the historical playback, the last display time of these graphics can be set by a human-machine interaction operation, and the history state is still continuously displayed after the historical playback.

An embodiment of a matrix group is described below.

In another embodiment, the step S502 of determining a plurality of rectangular sub-regions includes determining a plurality of rectangular sub-regions of the same size and aligned in the display window, and the number, relative position, size, and financial characteristics' combination of each financial graphic within each rectangular sub-region are the same, thereby forming a matrix group with the number of rectangular sub-regions in the direction of rows and columns as the dimension.

Figure 23:
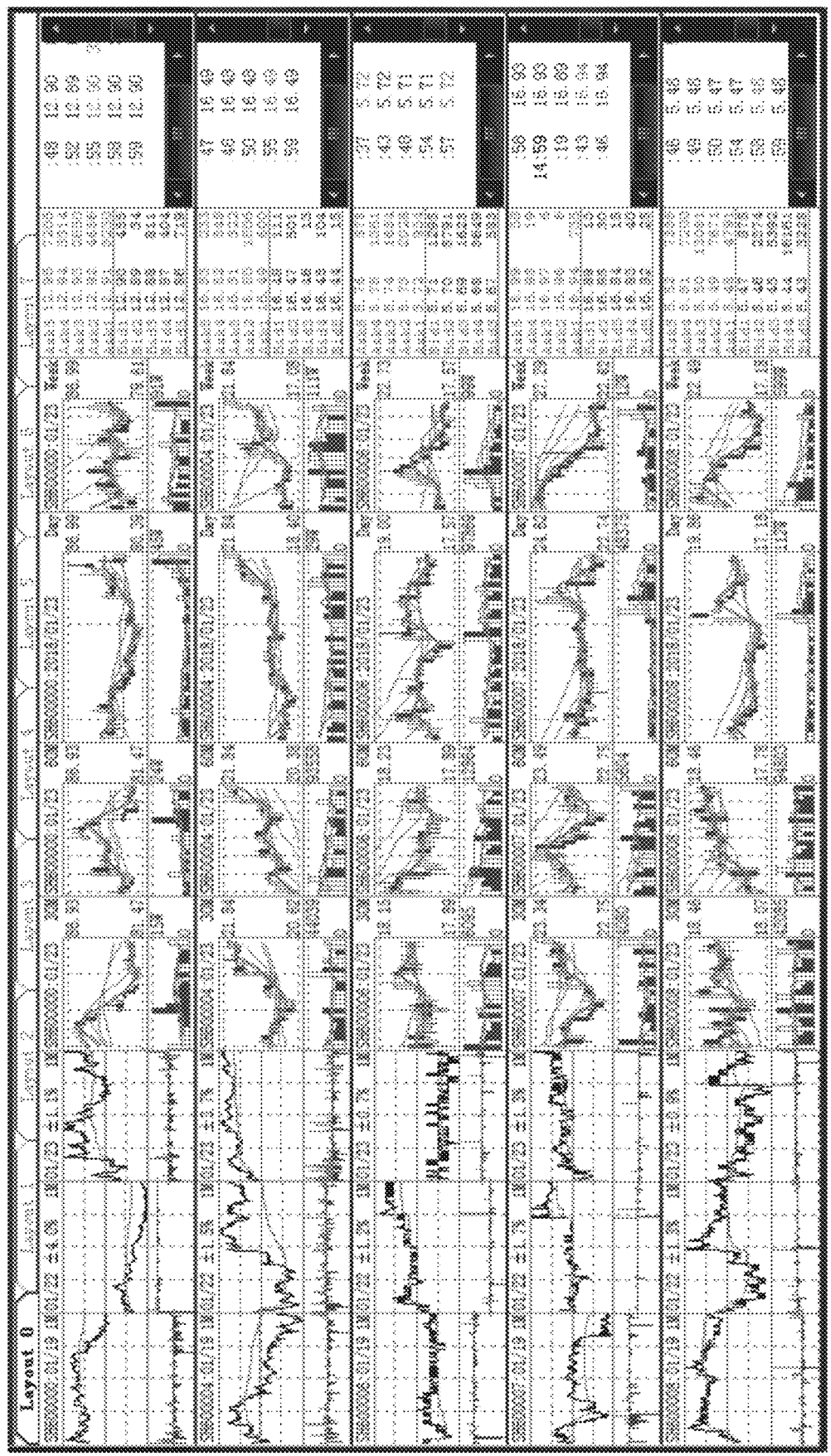
FIG. 23-25 are screenshots of a matrix group according to an embodiment of the present disclosure.
Figure 25:
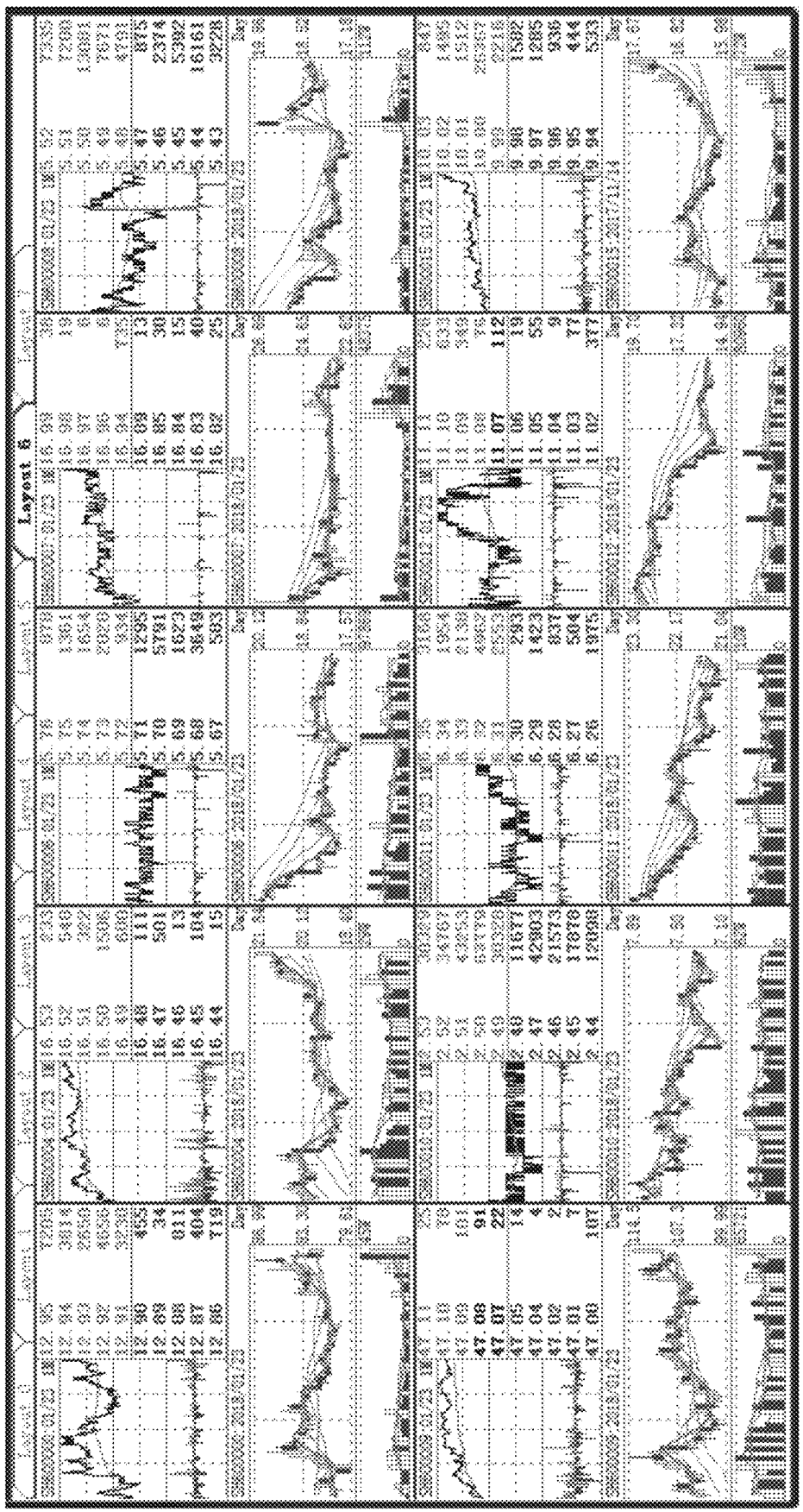

FIG. 24 is an exemplary screenshot of a matrix group in which internal rectangular sub-regions are partitioned as shown in FIG. 8, there are 5 rows, 2 per row, it is a 5×2 matrix group, and each rectangular sub-region contains 4 financial graphics. FIG. 23 is a matrix group of 5×1, and the internal rectangular partitioning is shown in FIG. 6. FIG. 25 is a 2×5 matrix group. It can be seen that this arrangement is simple and neat, and easy to observe. Moreover, because of the aligned arrangement, the financial graphics within the different rectangular sub-regions are also located in the same column or in the same row. This layout not only omits a large number of switching operations and can be compared on the same screen, but also has a more intuitive and more obvious comparison manner of the same row or the same row, which produces a better overall and efficient contrast effect. Therefore, the matrix group not only greatly improves the browsing efficiency, but also expands the multi-graphic display of the financial varieties from the one-dimensional display to a more intuitive two-dimensional display.

Figure 10:
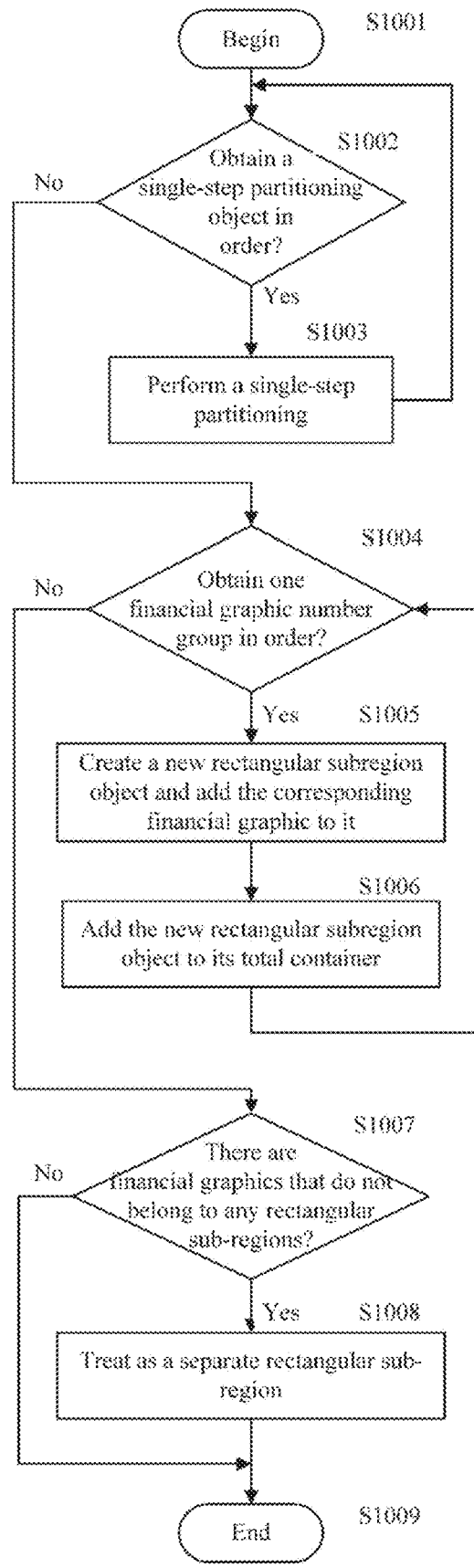
FIG. 10 is a flowchart of a multi-step partitioning operation according to an embodiment of the present disclosure.

In one embodiment of the matrix group, the rectangular sub-regions in the matrix group can be treated as a general plurality of rectangular sub-regions, and the rectangular sub-regions can be partitioned according to the general flow shown in FIG. 10.

In the second embodiment of the matrix group, multi-step partitioning of a fixed flow is adopted according to the characteristics of the matrix group. For example, using the PartitionGridRectSubregion function described above, the partitioning is performed as shown in FIG. 11.

The third embodiment of a matrix group defines a class of a matrix group according to the characteristics of the matrix group and using an object-oriented method. It contains a container for internal rectangular partitioning objects, partitioning data, partitioning functions and drawing functions. Wherein the partitioning function determines the rectangular sub-regions inside the matrix group and the positions of the financial graphic according to the partitioning data, the drawing function is used to draw the rectangular sub-regions inside the matrix group one by one, all financial graphics within the rectangular sub-region are then drawn.

Figure 22:
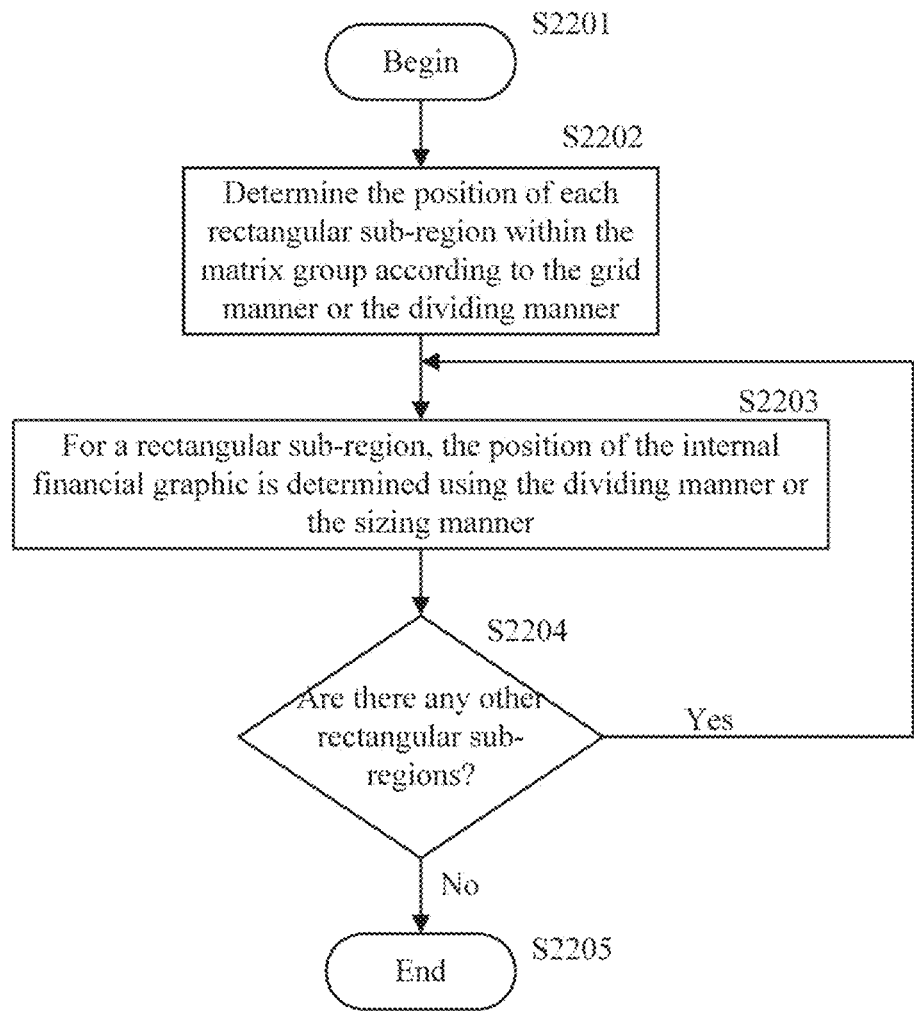
FIG. 22 is a flowchart of a matrix group generating operation according to an embodiment of the present disclosure.

In one embodiment, the partitioning function of the matrix group is drawn according to the flow chart shown in FIG. 22 according to the characteristics of the matrix group itself. After beginning (S2201), in step S502 of determining a number of rectangular sub-regions, the positions of the respective rectangular sub-regions within the matrix group are determined using a grid manner or a dividing manner (S2202). Then, within one rectangular sub-region, the position of the financial graphic is determined using a dividing manner or a sizing manner (S2203), wherein the sizing manner includes a sizing manner according to the financial characteristic. Finally, it is determined whether there are other rectangular sub-regions (S2204), and if there is, step S2203 is repeated, and if there is no, the process ends (S2205). In that above process, each time the position of a rectangular sub-region is determined, its object is created and added to a container of rectangular sub-region objects within the matrix group. Each time the position of a financial graphic is determined, a financial graphic object is created and it is added to the corresponding rectangular sub-region object.

According to the above embodiment, when determining the position of the rectangular sub-region in the matrix group, the grid manner or the dividing manner may be adopted. For example, the rectangular sub-regions of the screenshot shown in FIG. 24 can be obtained using a grid manner of 5×2 as shown in FIG. 8, or in the aforementioned PartitionGridRectSubRegion function, a dividing manner is adopted in the Y direction and the X direction, respectively.

The flow of the above embodiment also explains that, when determining the position of the internal financial graphic of the rectangular sub-region in the matrix group, a dividing manner or a sizing manner is adopted, wherein the sizing manner includes a sizing manner according to the financial characteristics. For example, the rectangular sub-regions in the snapshot shown in FIG. 24 can be used to determine the position of the financial graphic according to the financial characteristics of 60M, 30M, Day and 1M, or directly according to the dimensions of 100, 100, 150, 100. In the snapshot shown in FIG. 25, the positions of the upper and lower financial graphics are determined by using a dividing manner with equal fraction of 2 in the Y direction inside each rectangular sub-region.

On the initial partition data of a matrix group.

When determining the position of the rectangular sub-regions within the matrix group, the partitioning manner or the dividing manner may be used, as described above, but the number of partitioning in the Y direction and the X direction need to be determined. For example, "nXCount" and "nYCount" in the human-machine interaction menu shown in FIG. 14 are used to determine the layout of the matrix group.

When determining the position of the internal financial graphic of the rectangular sub-region in the matrix group, since the arrangement of the financial graphics in all the rectangular sub-regions is the same, only one arrangement of the financial graphics inside the rectangular sub-region is required. For example, the partitioning data in the "Financial Characteristics" input box in the human-machine interaction menu shown in FIG. 14. In that partitioning process, the interior of all the rectangular sub-regions in the matrix group is partitioned by a sizing manner according to the financial characteristics with the partitioning data as a parameter.

Figure 26:
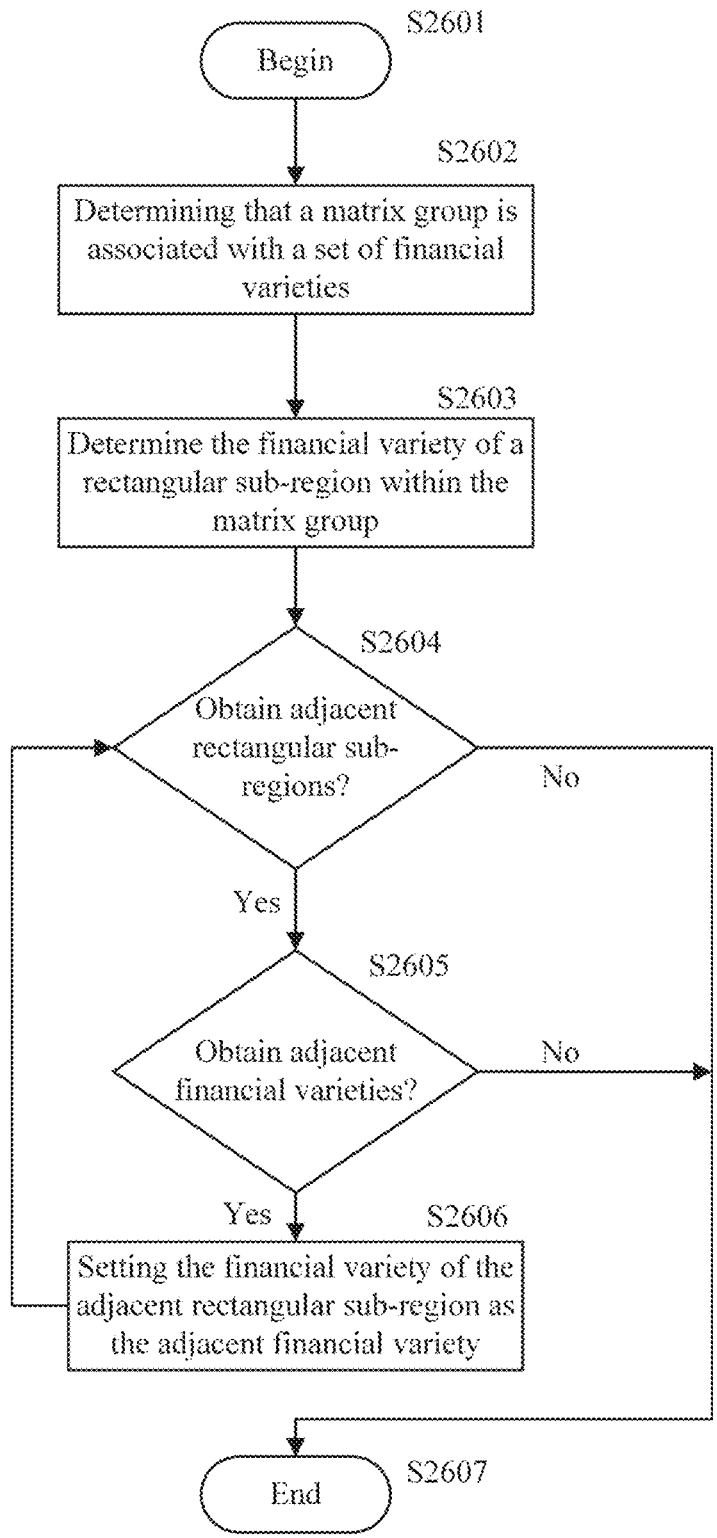
FIG. 26 is a flowchart in which a matrix group is associated with a set of financial varieties according to an embodiment of the disclosure.

In another embodiment, processing unit 101 may execute instructions to associate each rectangular sub-region within a matrix group with a set of target financial varieties. The specific process is shown in FIG. 26, after the flow beginning (S2601), it is determined that the matrix group is associated with a set of financial varieties (S2602). For example, right-click on any financial graphic, and finally select a a set of financial varieties in the pop-up menu. Then, in the set of financial varieties, the financial variety of a rectangular sub-region within the matrix group is determined (S2603), for example, the financial variety of the first rectangular sub-region is set as the first financial variety in the set of financial varieties. The adjacent rectangular sub-regions within the matrix group are then obtained (S2604), for example, the second rectangular sub-region within the matrix group is obtained. If successful, the financial variety adjacent to the previous financial variety in the set of financial varieties is then obtained (S2605), for example, the second financial variety in the set of financial varieties is obtained. If successful, the financial variety of the adjacent rectangular sub-region is set as the adjacent financial variety (S2606), that is, the financial variety of the second rectangular sub-region is set as the second financial variety. And so on, until all the rectangular sub-regions are set so that the step S2604 to obtain the adjacent rectangular sub-regions returns a negative conclusion, alternatively, the step S2605 in which the setting of all the financial varieties is completed so as to return a negative conclusion for the obtaining of the adjacent financial varieties ends (S2607).

In the above embodiment, if there are 10 rectangular sub-regions in one matrix group, the 10th rectangular sub-region corresponds to the 10th financial variety in the set of financial varieties. If a page-turning instruction is issued through human-machine interaction, the financial variety of the first rectangular sub-region is redetermined to be the next financial variety of the 10th financial variety, that is, the 11th financial variety. The financial varieties of the adjacent rectangular sub-regions are then determined as the 12th, 13 th- and the 20th financial varieties in order.

In another embodiment, a portion of the rectangular sub-regions in the matrix group is associated with a set of financial varieties, while the remaining rectangular sub-regions may display a composite indicator or the like and serve as a fixed reference for comparison without changing their financial variety codes during page-turning.

In another embodiment, the financial categories may also be displayed within the matrix group in the order of sorting result by an indicator. For example, after being associated with the set of financial varieties, the order of the financial varieties displayed in the matrix group defaults to the order of the financial varieties in the set of the financial varieties. However, a certain indicator may be used to sort the financial varieties in the set associated with the matrix group, and the financial varieties may be displayed in the order after sorting. That is, the financial varieties displayed in the first, second, third . . . . Rectangular sub-regions in the matrix group are determined to be the financial varieties corresponding to the first, second, third . . . after the sorting.

Generally, the sorting result of software is displayed in the list of financial varieties, and only the status of each financial variety at a certain time can be simply recorded in the list in a numerical manner. It is impossible to graphically display the trend within a certain period of time, so it is impossible to predict the trend and trend of the prices of financial varieties. Therefore, the user also needs to click each financial variety in the list one by one, and display a single periodic graphic of a single financial variety in other parts of the display window. Therefore, it not only occupies the display space, but also requires additional operation by the user, and more importantly, it does not have a comprehensive and efficient contrast effect.

Figure 27:
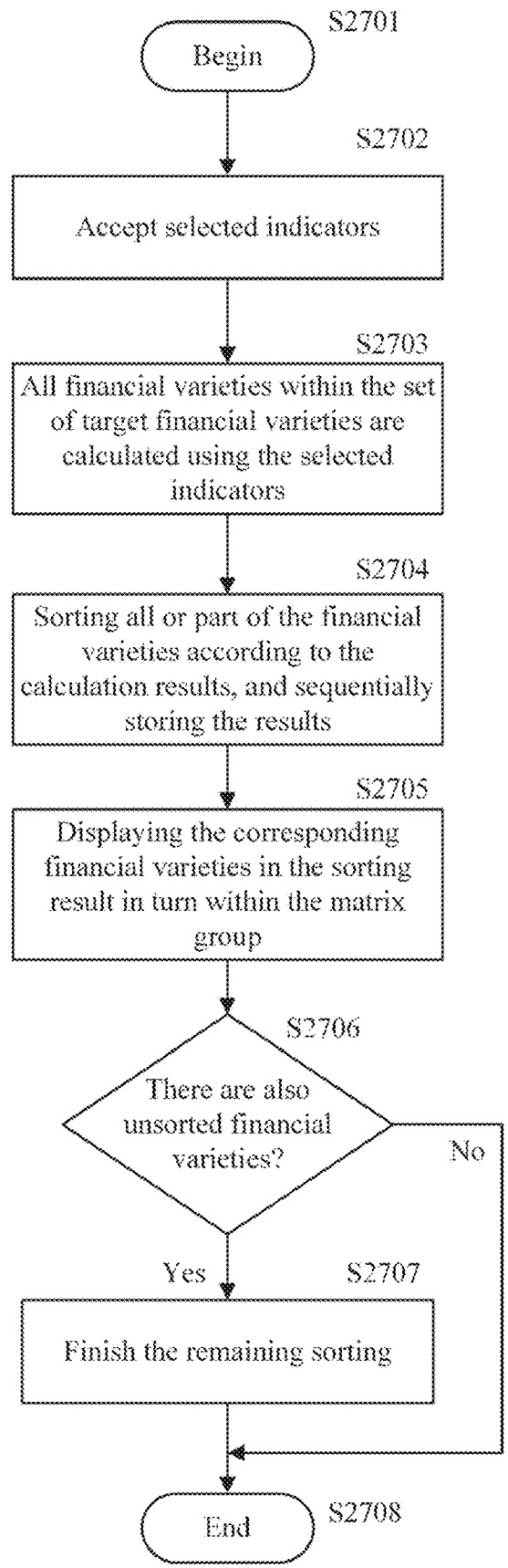
FIG. 27 is a flowchart of displaying the sorting result by an indicator with a matrix group according to an embodiment of the present disclosure.

A specific embodiment is shown in FIG. 27. For example, the user clicks on any one of the financial graphics in the matrix group and selects the "Indicator Sorting" command in the pop-up menu, and the program begins when the command is received (S2701). First, a pop-up window displays all the names of the indicators, and accepts the indicators selected by the user (S2702), such as "Increase". Then, all financial varieties in the set of target financial varieties are calculated by using the selected indicators (S2703), which are existing technologies and will not be described in detail. Sort all or part of the financial varieties according to the calculation result, and save the sorting result in turn (S2704), for example, in a sorting result plate. In this step, all of that financial variety can be sorted, but also be partially sorted, for example, the matrix group itself has only 10 rectangular sub-regions, the standard library function std.: Partial_sort can be used, calculate the top 10 financial varieties first, so that in the case of a plurality of financial varieties, the top 10 financial varieties that have been sorted can be displayed first, thus greatly saving the user's waiting time for sorting calculation. Then, the program sequentially displays the financial varieties corresponding to the sorting result within the matrix group (S2705), such as the financial varieties in the sorting result plate. After the display is completed, if there are any unsorted financial varieties (S2706), the remaining sorting calculation for these financial varieties is continued (S2707) for the user to turn the page for observation. Finally, it ends (S2708).

According to the method of the above embodiment, not only the list position of the financial varieties for displaying the sorting result and the operation steps of the user are saved, but also the sorting result is directly displayed as a graphical matrix group. It also has the advantages of the matrix group itself while displaying a plurality of financial varieties in sequence.

In another embodiment, the processing unit 101 may execute instructions to automatically display the financial varieties selected by the indicator calculation using the set of matrices.

For example, in the stock market, according to the stock selection formula, such as "increase>=5%," the selection of desired stocks is also called formula stock selection. Wherein, the "increase" is an indicator and ">=5" is the selection condition. General software stock selection results are also displayed in the list of financial varieties, which have the same problems as the above-mentioned indicator sorting.

Figure 28:
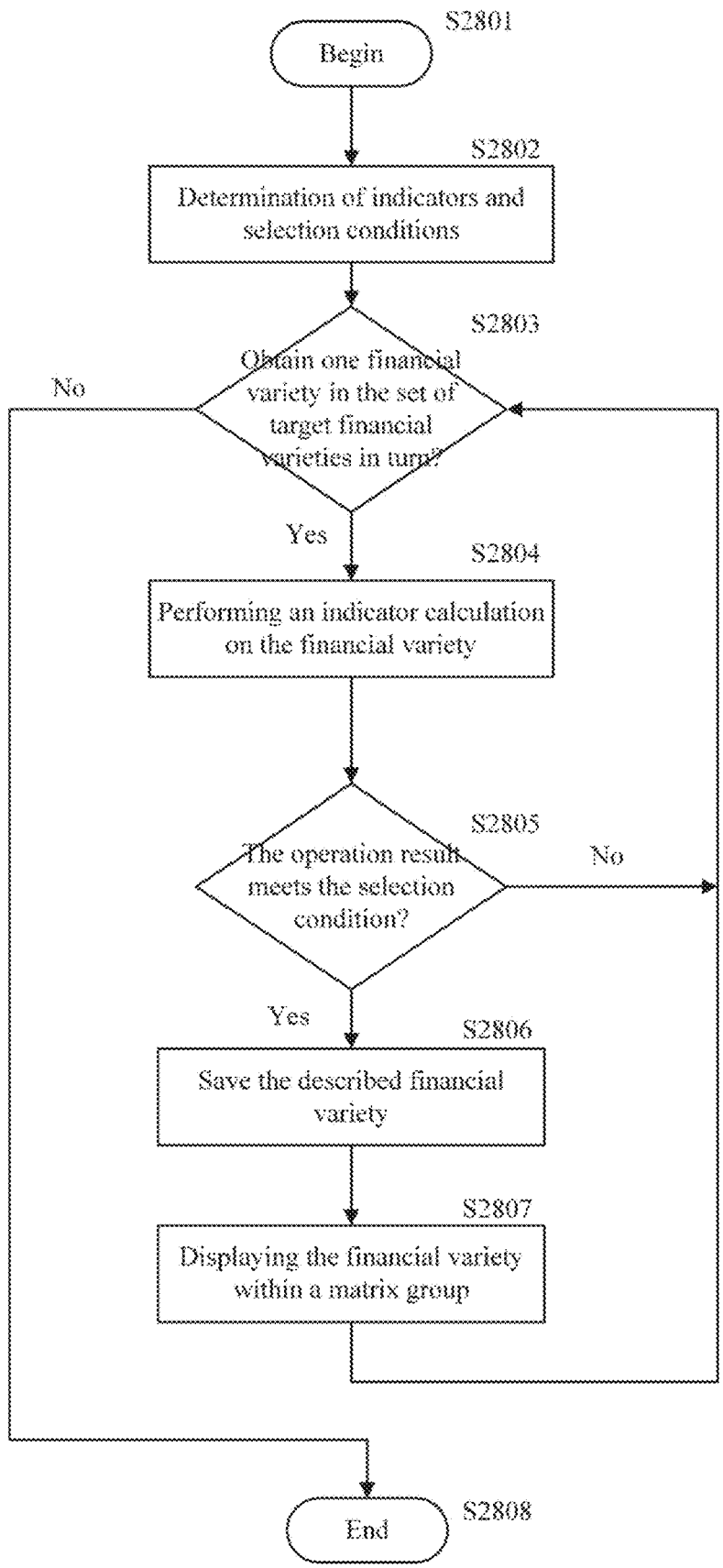
FIG. 28 is a flowchart of displaying indicator calculation result with a matrix group according to an embodiment of the present disclosure.

In this embodiment, the flow is shown in FIG. 28. For example, the user clicks any one of the financial graphics in the matrix group and selects the "Formula stock selection" command in the pop-up menu, and the program begins when the command is received (S2801). A pop-up window displays the names of all indicators and the input box for selected conditions. The program accepts an indicator selected by the user through this window such as "increase" and an input selection condition such as ">=5", so as to determine the indicator and the selection condition (S2802). Then, one financial variety in the set of target financial varieties is obtained successively (S2803). If successful, according to the existing technology, an indicator calculation is performed on the financial variety (S2804), for example, an increase rate of the financial variety is calculated. It is determined whether the indicator calculation result meets the selection condition (S2805). If so, the financial variety is saved (S2806), for example, when the increase is >=5%, the financial variety is added to the stock selection result board. The financial variety is then displayed within the matrix group (S2807). In this step, when it is detected that all of the rectangular sub-regions in the matrix group are used to display the selected financial variety and there are no vacant rectangular sub-regions to display the newly selected financial variety, automatic page turning can be set to display the newly selected financial variety from the beginning in a new page, or to scroll up one or more lines and display the newly selected financial variety in a new line. Then, the process proceeds to obtain the next financial variety again (S2803), and if the process is successful, the process is repeated, otherwise the process is ended (S2808). In this embodiment, the selected financial variety is displayed in the indicator calculation process. Since the calculation of indicators may involve a large number of financial varieties, data and complex processes, it may be a long process, so it is important to display the selected financial varieties in a timely manner.

In another embodiment, that step S2807 of display the selected financial variety is performed after the indicator calculation and comparison of all the financial varieties are completed, that is, in FIG. 28, after step S2806 is completed, the process directly returns to step S2803 to obtain the next financial variety and continues calculation until all the financial varieties are calculated. Step S2807 is performed to display the result of determination in step S2803. When the display is completed, the step S2808 ends. Obviously, this way of displaying all the indicators after they have been calculated will cause the user to wait a longer time.

Figure 29:
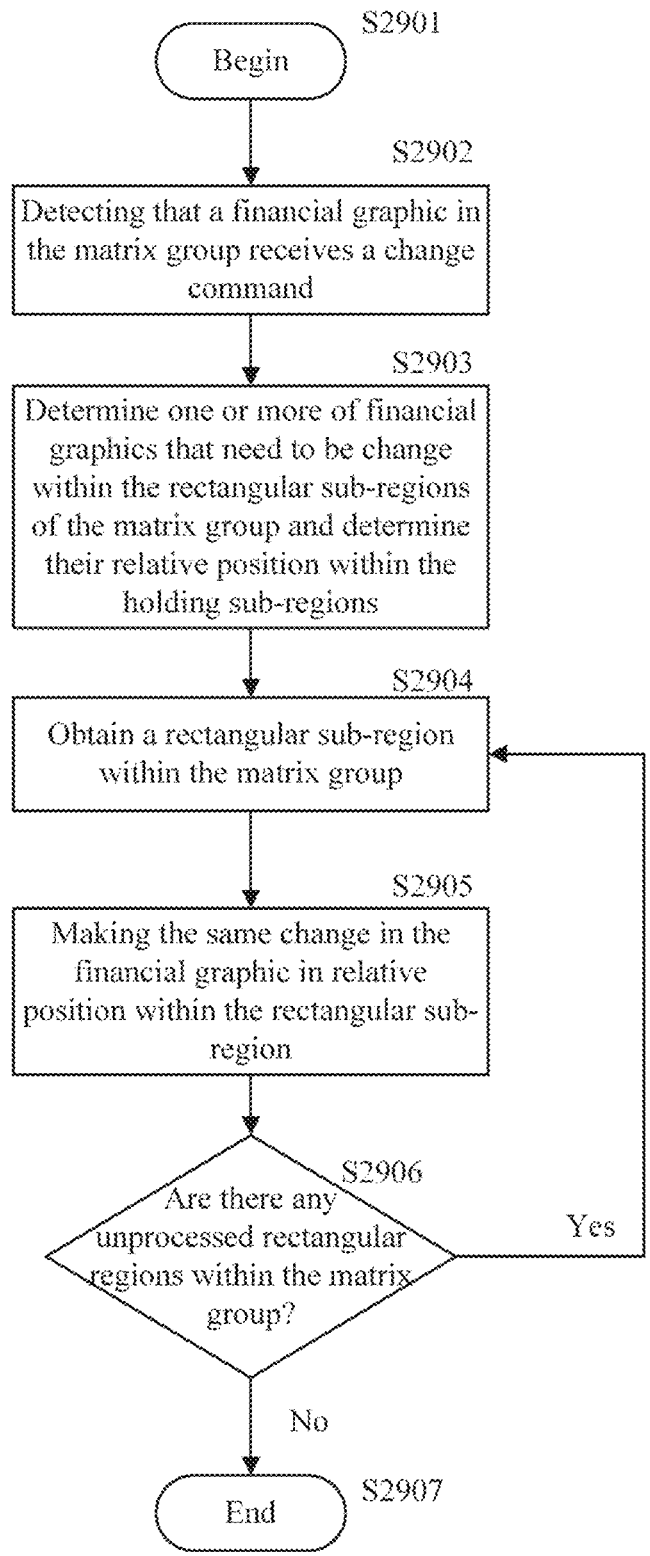
FIG. 29 is a flowchart of a changing operation of a matrix group according to an embodiment of the present disclosure.

In another embodiment, as shown in FIG. 29, after the process begins (S2901), the processing unit 101 executes instructions to detect that a financial graphic within the matrix group receives a change command (S2902), one or more financial graphics to be changed within the rectangular sub-regions within the matrix group are determined, and their relative positions within the rectangular sub-regions are determined (S2903). Then, a rectangular sub-region within the matrix group is obtained (S2904), and the financial graphic of the relative position within the rectangular sub-region is uniformly changed (S2905). Then, it is determined whether there are any other unprocessed rectangular sub-regions in the matrix group (S2906), and if there is, the process returns to step S2904, and if not, the process ends (S2907). In steps S2904 to S2906 of this stage, the financial graphic located at the relative position in each of the rectangular sub-regions in the matrix group is actually changed in accordance with the change command.

In step S2903, if some changes are made to one financial graphic within that rectangular sub-region, not only the financial graphic needs to be changed, moreover, other financial graphics in the rectangular sub-region in which the financial graphic is located may also need to be changed, depending on the specific content of the changes. In a single rectangular sub-region, for example, if the change command is to adjust the space of the K-line elements, graphic adjustment for all K-lines, such as 30 min, a daily graphic, etc., may be set. If the financial characteristic is changed, and the name of the technical indicator of the periodic financial graphic is changed, the financial graphic adopting the technical indicator of the same name is also adjusted. If the last display time of the periodic graphic is changed and the position and the size of the rectangular sub-region are kept unchanged, the boundary line of the adjacent financial graphics in the rectangular sub-region are adjusted through human-machine interaction, only two adjacent financial graphics are adjusted. All the adjustments or changes to financial graphics in this paragraph are based on existing technologies and will not be described in detail.

After the graphic to be adjusted within one rectangular sub-region is determined, since the arrangement of the rectangular sub-regions within the matrix group is the same, in step S2903, the relative positions may be used to determine the positions of the graphics that need to be adjusted within the other rectangular sub-regions. In this embodiment, the relative position is represented by the position number of the financial graphic in the object of the rectangular sub-region. For example, in the snapshot shown in FIG. 24, in order to adjust the K-line spacing, the sequence numbers of the financial graphics to be adjusted in the rectangular sub-regions are respectively 0, 1 and 2, and then for each rectangular sub-region, all financial graphics with internal sequence numbers of 0, 1 and 2 are adjusted.

The method for automatic batch modification of financial graphic information in a matrix group can be summarized as follows:

detecting whether a change command is received on any of the financial graphics within the matrix group; and determining one or more financial graphics to be changed in each rectangular sub-region within the matrix group according to the change command, and performing the corresponding changes.

In addition, that present disclosure is directed to a computer-readable storage medium having stored thereon a program including instructions that, when loaded and executed by a processor such as a CPU, can be used to implement the multi-graphic display method described herein.

The embodiments of the present disclosure are, if not specified, preferred embodiments. Although some embodiments of the present disclosure have been described in detail, it should be understood by those skilled in the field that the above-described embodiments are illustrative only and do not limit the scope of the disclosure for the sake of completeness of the description. It should also be understood that the above-described embodiments may be combined, modified or substituted without deviating from the scope and substance of the present disclosure. The scope of the present disclosure is defined by the appended claims.

The invention claimed is:

1. A multi-graph display method, in which a processor is applied to execute instructions to perform the following steps:
   determining a position of each financial graphic within a display window;
   determining a plurality of rectangular sub-regions within the display window; wherein
   at least one rectangular sub-region contains a plurality of financial graphics; and
   financial varieties of the plurality of financial graphics contained in a single rectangular sub-region are the same;
   setting financial characteristics of the financial graphics; wherein the financial characteristics of the plurality of the financial graphics in a rectangular sub-region are not all the same;
   setting the financial varieties of the financial graphics in each of rectangular sub-regions; wherein,
   in the case that two or more rectangular sub-regions in the display window respectively contain a plurality of periodic financial graphics at the same time, the financial characteristics of at least two periodic financial graphics of the first rectangular sub-region are set the same as those of at least two periodic financial graphics of the second rectangular sub-region respectively; and an overall scope of each of rectangular sub-regions is highlighted, by drawing boundary lines between the rectangular sub-regions so that compared to the boundary lines between the financial graphics inside the rectangular sub-region, the boundary lines between the rectangular sub-regions are thicker and/or of different colors, or by drawing boundary lines of the financial graphics in different rectangular sub-regions with different colors; or
   in the case that only one rectangular sub-region in the display window contains a plurality of periodic financial graphics, a plurality of other rectangular sub-regions in the display window contain one periodic financial graphic of different financial varieties respectively, and all or a portion of the plurality of other rectangular sub-regions are dynamically associated with the one rectangular sub-region.

2. The method of claim 1, wherein, in the step of determining the plurality of rectangular sub-regions within the display window, a container method or a static association method is applied to implement the rectangular sub-regions.

3. The method of claim 1, wherein, any one of multiple single-step partitioning manners could be applied in a single partitioning step of a multi-step partitioning for determining the position of each financial graphics or for determining the rectangular sub-regions; and the manners employ a fixed process, or the manners are entirely based on a partitioning data.

4. The method of claim 1, wherein, in the step of determining the position of each financial graphics,
   a built-in initial partitioning data is used, wherein a fixed one of the multiple single-step partitioning manners could be applied in a single partitioning step in the built-in initial partitioning data;
   or the initial partitioning data in an external file is used, wherein any one of multiple single-step partitioning manners could be applied in a single partitioning step in the initial partitioning data in the external file;
   or the initial partitioning data formed through a human-machine interaction, wherein any one of multiple single-step partitioning manners could be applied when setting a single partitioning step in the human-machine interaction.

5. The method of claim 1, wherein, in the steps of determining the position of each financial graphics:
   at least one of the single-step partitioning manners applied for the built-in initial partitioning data when a built-in initial partitioning data is used,
   or at least one of the single-step partitioning manners applied for the initial partitioning data in an external file when the initial partitioning data in the external file is used,
   or at least one of the single-step partitioning manners applied when setting a single partitioning step in a human-machine interaction when the initial partitioning data formed by human-machine interaction is used;
   includes one of following partitioning manners: dividing manner, grid manner, or sizing manner, and could add a plurality of rectangular display areas.

6. The method of claim 4, wherein, when two or more financial graphics are arranged as a row or a column in a target rectangular area to be divided,
   the single-step partitioning manner applied in the built-in initial partitioning data, or a single-step partitioning manner applied in the initial partitioning data of the external file, or at least one single-step partitioning manner applied when setting a single partitioning step in the human-machine interactive operation,
   is a sizing manner; and an initial size of the financial graphics is preset according to the financial characteristics of the financial graphics.

7. The method of claim 1, wherein, a common boundary line is shared between adjacent financial graphics.

8. The method of claim 1, wherein, further comprising, merging adjacent rectangular sub-regions into combined rectangular sub-regions for displaying one financial variety.

9. The method of claim 8, further comprising, the overall scope of the combined rectangular sub-region is highlighted, by:
   drawing the boundary lines between the combined rectangular sub-regions so that compared to the boundary lines between financial graphics inside the combined rectangular sub-regions, the lines between the combined rectangular sub-regions are thicker and/or of different color; or
   drawing boundary lines of the financial graphics in different combined rectangular sub-regions with different colors.

10. The method of claim 1, further comprising,
    setting a source rectangular sub-region of the plurality of rectangular sub-regions to be dynamically associated with a target rectangular sub-region;
    upon detection of a command issued by a human-machine interactive operation on the financial graphic of the source rectangular sub-region to change a financial graphic information of the target rectangular sub-region, setting the target rectangular sub-region with financial graphic information provided by the financial graphic of the source rectangular sub-region, wherein, the financial graphic information includes at least one of the followings: a financial variety code, a collection of financial varieties, or a last display time.

11. The method of 1, further comprising,
    setting a target rectangle sub-region to be associated with a set of target financial varieties; and upon detection of a command on the target rectangular sub-region to browse a financial variety within the set setting the financial varieties of all the financial graphics within the target rectangular sub-region as financial variety that is adjacent to the current financial variety of the target rectangular sub-region within the set.

12. The method of claim 1, further comprising,
determining a historical playback time point at which the historical playback is to be performed;
determining one or more target rectangular sub-regions for the historical playback;
determining the target financial graphic requiring the historical playback within the target rectangular sub-region; and
adjusting a last display time of the financial graphic requiring the historical playback within the target rectangular sub-region to the historical playback time point.

13. The method of claim 1, wherein, the step of determining a plurality of rectangular sub-regions comprises:
determining a number of rectangular sub-regions of the same size and aligned in the display window; and a number, a relative position, a size, and a combination of financial characteristics of the financial graphics within each rectangular sub-regions are all the same, so as to form a matrix group with the number of rectangular sub-regions in the direction of rows and columns as the dimension.

14. The method of claim 13, wherein, when determining the position of the rectangular sub-regions within the matrix group, a grid manner or a dividing manner is adopted; or
when determining the position of the internal financial graphic of the rectangular sub-regions within the matrix group, a dividing manner or a sizing manner is adopted, wherein, the sizing manner comprises a sizing manner according to the financial characteristics.

15. The method of claim 13, wherein, with respect to an initial dividing data of the matrix group,
when determining the position of the rectangular sub-regions within the matrix group, the number of divisions in Y direction and X direction need to be determined; or
when determining the position of the internal financial graphic of the rectangular sub-regions within the matrix group, only the arrangement of the financial graphics within one rectangular sub-region needs to be determined.

16. The method of claim 13, wherein, further comprising,
associating the number of rectangular sub-regions within the matrix group with a set of financial varieties;
determining one financial variety from the set of financial varieties as a financial variety of a rectangular sub-region in the matrix group; and
determining that financial varieties of the adjacent rectangular sub-regions in the matrix group are respectively other financial varieties within the set of financial varieties and are sequentially adjacent to the one financial variety from the set of financial varieties.

17. The method of claim 13, further comprising, displaying the financial varieties within each rectangular sub-regions in the matrix group in accordance with an order of the sorting results by an indicator, during or after a sorting process.

18. The method of claim 13, further comprising, automatically displaying financial varieties selected by an indicator calculation within the matrix group during or after a process of an indicator calculation.

19. The method of claim 13, wherein, further comprising,
detecting whether a variation command is received on any of the financial graphics within the matrix group; and
determining one or more financial graphics to be varied within each rectangular sub-region in the matrix group according to the variation command, and performing corresponding variations.

20. A non-transitory computer-readable medium containing a computer program, in which the computer program, when being loaded and executed by a processor, causes the processor to:
determining a position of each financial graphic within a display window;
determining a plurality of rectangular sub-regions within the display window; wherein
at least one rectangular sub-region contains a plurality of financial graphics; and
financial varieties of the plurality of financial graphics contained in a single rectangular sub-region are the same;
setting financial characteristics of the financial graphics; wherein the financial characteristics of the plurality of the financial graphics in a rectangular sub-region are not all the same;
setting the financial varieties of the financial graphics in each of rectangular sub-regions; wherein,
in the case that two or more rectangular sub-regions in the display window respectively contain a plurality of periodic financial graphics at the same time, the financial characteristics of at least two periodic financial graphics of the first rectangular sub-region are set the same as those of at least two periodic financial graphics of the second rectangular sub-region respectively; and an overall scope of each of rectangular sub-regions is highlighted, by drawing boundary lines between the rectangular sub-regions so that compared to the boundary lines between the financial graphics inside the rectangular sub-region, the boundary lines between the rectangular sub-regions are thicker and/or of different colors, or by drawing boundary lines of the financial graphics in different rectangular sub-regions with different colors; or
in the case that only one rectangular sub-region in the display window contains a plurality of periodic financial graphics, a plurality of other rectangular sub-regions in the display window contain one periodic financial graphic of different financial varieties respectively, and all or a portion of the plurality of other rectangular sub-regions are dynamically associated with the one rectangular sub-region.

* * * * *